(12) United States Patent
Otani et al.

(10) Patent No.: US 8,045,762 B2
(45) Date of Patent: Oct. 25, 2011

(54) SURVEYING METHOD, SURVEYING SYSTEM AND SURVEYING DATA PROCESSING PROGRAM

(75) Inventors: Hitoshi Otani, Itabashi (JP); Tadayuki Ito, Itabashi (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 1085 days.

(21) Appl. No.: 11/899,051

(22) Filed: Sep. 4, 2007

(65) Prior Publication Data

US 2008/0075326 A1   Mar. 27, 2008

(30) Foreign Application Priority Data

Sep. 25, 2006   (JP) .................................. 2006-259607

(51) Int. Cl.
*G06K 9/00* (2006.01)
*H04N 15/00* (2006.01)
*H04N 7/16* (2011.01)
(52) U.S. Cl. ................................ 382/109; 348/42; 725/9
(58) Field of Classification Search .................. 382/109, 382/154, 318, 319; 356/3.09, 4.01, 918, 356/919; 348/42, 51, 67, 96–100, 195, 201, 348/206; 358/474, 487, 505, 506; 705/14.44; 725/9
See application file for complete search history.

(56) References Cited

U.S. PATENT DOCUMENTS

| | | | |
|---|---|---|---|
| 6,246,468 B1 * | 6/2001 | Dimsdale | 356/4.02 |
| 7,689,032 B2 * | 3/2010 | Strassenburg-Kleciak | 382/154 |
| 7,804,498 B1 * | 9/2010 | Graham et al. | 345/419 |
| 2005/0213808 A1 | 9/2005 | Ohtomo et al. | 382/154 |
| 2006/0188143 A1 | 8/2006 | Strassenburg-Kleciak | 382/154 |

FOREIGN PATENT DOCUMENTS

| | | |
|---|---|---|
| EP | 1 176 393 | 1/2002 |
| EP | 1 544 800 | 6/2005 |
| EP | 1 662 228 | 5/2006 |
| JP | 2004-163292 | 6/2004 |
| JP | 2005-283221 | 10/2005 |
| WO | 01/31290 | 5/2001 |

* cited by examiner

*Primary Examiner* — Abolfazl Tabatabai
(74) *Attorney, Agent, or Firm* — Nields, Lemack & Frame, LLC

(57) ABSTRACT

There are provided a step of acquiring a main point cloud data on a predetermined measurement range by a laser scanner, a step of detecting a range with no data acquired, a step of acquiring a supplementary image data of the range with no data acquired by an auxiliary image pickup device, a step of preparing a stereoscopic image based on the supplementary image data obtained by the auxiliary image pickup device, a step of acquiring supplementary point cloud data from the stereoscopic image, and a step of supplementing the range with no data acquired of the main point cloud data by matching of the main point cloud data and the supplementary point cloud data.

18 Claims, 22 Drawing Sheets

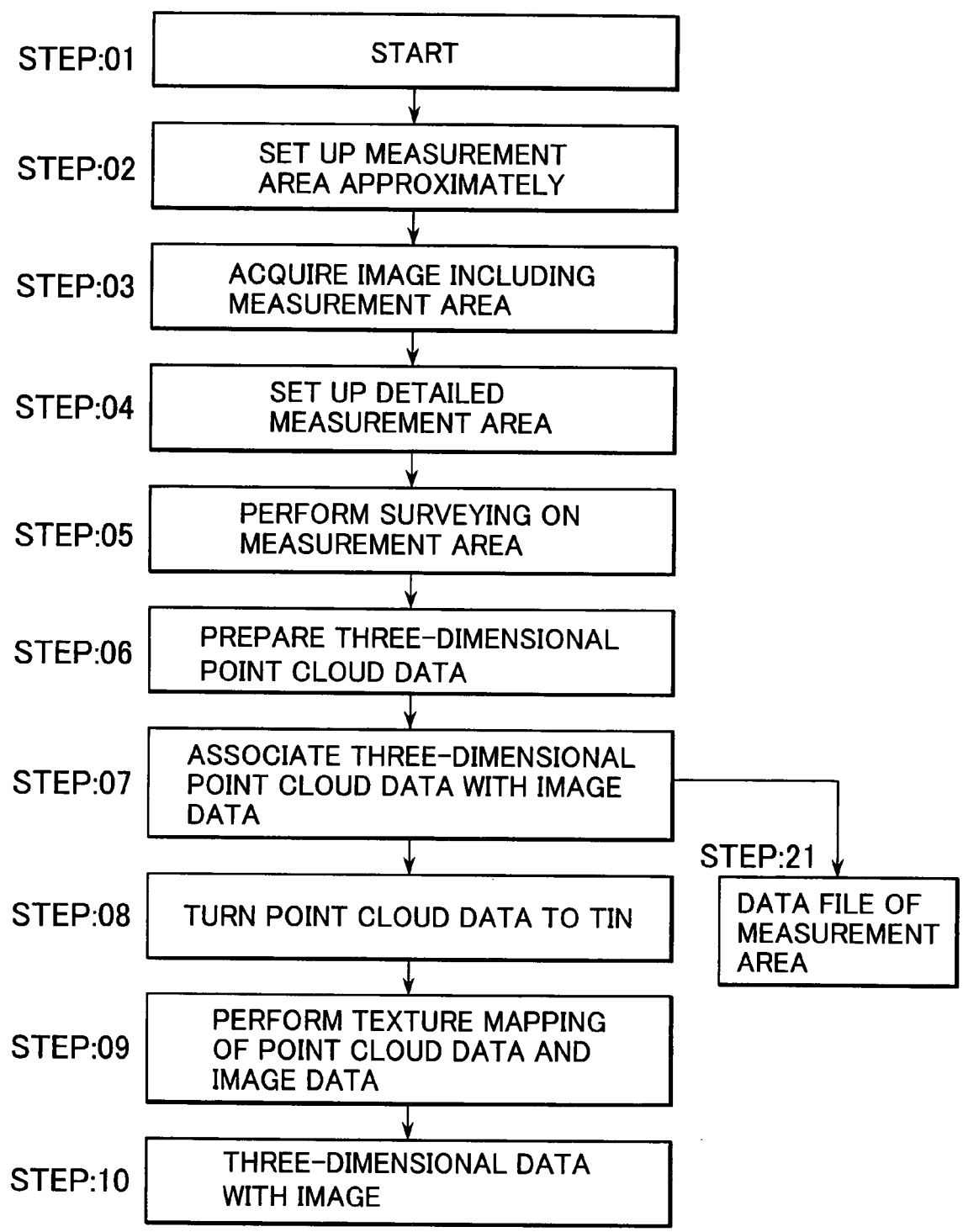

FIG.15(B)
FIG.15(A)
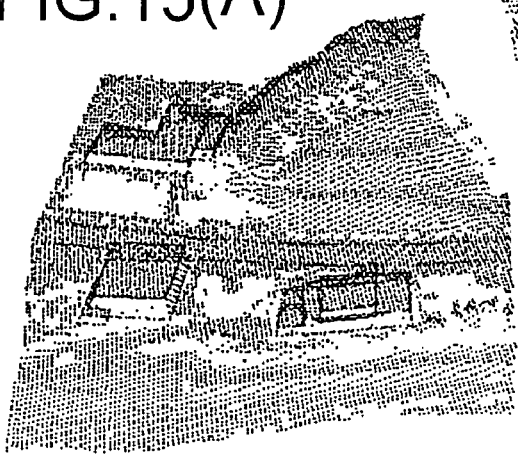
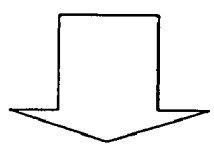
FIG.15(C)
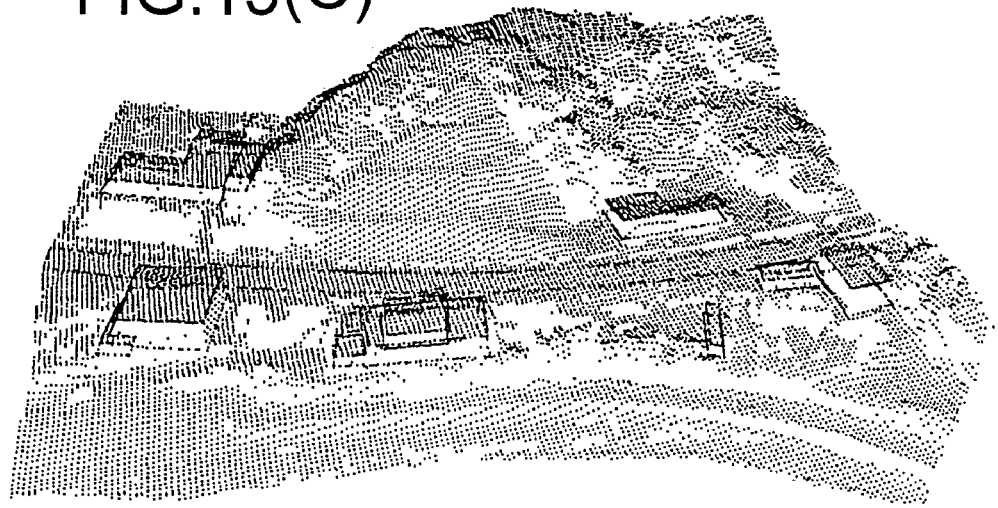

98 template
$f1(i,j)$ matching window
$f2(x,y)$

SURVEYING METHOD, SURVEYING SYSTEM AND SURVEYING DATA PROCESSING PROGRAM

BACKGROUND OF THE INVENTION

The present invention relates to a surveying method, a surveying system, and a surveying data processing program for acquiring three-dimensional data of a predetermined area.

In recent years, three-dimensional surveying on three-dimensional object has been more frequently performed, and there are now growing demands on an image with three-dimensional data to be used for an electronic map. Because of such circumstances or the like, the amount of the data required for surveying purpose has extensively increased.

A laser scanner is known as a surveying system for measuring a large amount of three-dimensional data in detail and within short time.

A laser scanner is a surveying system for projecting a pulsed laser beam to a predetermined measurement area, for receiving a reflected light of the pulsed laser beam to measure three-dimensional position data at a projecting point of the pulsed laser beam for each pulse, and for acquiring point cloud data of the measurement area.

The laser scanner can obtain a large amount of point cloud data within short time. However, when obstacle(s) such as a vehicle, a tree, etc. are present in the measurement area, shadow (occlusion) occurs, and this causes a portion where the data is lacking. Also, because a distance is measured by the reflection of a pulsed laser beam, if reflectivity at the projecting point is low, e.g. if the laser beam used is in green color when the reflection point is in black color or in complementary color (i.e. in red color), the reflected light cannot be obtained. This causes a data-lacking portion to occur, too.

Further, when the measurement area is scanned from a horizontal direction, point cloud data cannot be obtained on the upper surface of a building or a structure, for instance.

For the purpose of obtaining point cloud data of the portion in occlusion, it has been practiced to move the laser scanner and to acquire the data of the portion in occlusion. Also, in order to obtain the point cloud data on the upper surface of a building or a structure, the laser scanner is moved to a position where the upper surface can be projected by the laser beam from the laser scanner to acquire the point cloud data on the upper surface.

For this purpose, every time the occlusion portion occurs, the laser scanner had to be moved. Or, large-scale equipment or tools such as a scaffold or an elevator or the like had to be installed to move the laser scanner to higher position. This means that tremendous efforts and long time are required for the surveying operation.

Also, when reflectivity is low at the point to be measured, such inconveniences often arise that the point cloud data cannot be obtained.

SUMMARY OF THE INVENTION

It is an object of the invention to make it possible to readily obtain data of a range, for which the data cannot be obtained by a laser scanner, and also to easily acquire point cloud data without data-lacking portion.

To attain the above object, the present invention provides a surveying method, which comprises a step of acquiring a main point cloud data on a predetermined measurement range by a laser scanner, a step of detecting a range with no data acquired, a step of acquiring a supplementary image data of the range with no data acquired by an auxiliary image pickup device, a step of preparing a stereoscopic image based on the supplementary image data obtained by the auxiliary image pickup device, a step of acquiring supplementary point cloud data from the stereoscopic image, and a step of supplementing the range with no data acquired of the main point cloud data by matching of the main point cloud data and the supplementary point cloud data. Also, the present invention provides the surveying method as described above, wherein the laser scanner acquires the point cloud data and a main image data associated with the point cloud data. Further, the present invention provides the surveying method as described above, wherein the matching of the main point cloud data and the supplementary point cloud data is performed by association of reference points adequately selected from the main point cloud data and points in the supplementary point cloud data corresponding to the reference points. Also, the present invention provides the surveying method as described above, wherein the matching of the main point cloud data and the supplementary point cloud data is performed by image matching of the main image data and the supplementary image data. Further, the present invention provides the surveying method as described above, wherein the range with no data acquired is a range adjacent to the measurement range. Also, the present invention provides the surveying method as described above, wherein the range with no data acquired is a data lacking portion, for which point data could not be obtained by the laser scanner. Further, the present invention provides the surveying method as described above, wherein the range with no data acquired is identified by displaying the main point cloud data in a display unit. Also, the present invention provides the surveying method as described above, wherein the range with no data acquired is identified by detecting a boundary where adjacent point data on the inner side is lacking in the main point cloud data.

Further, the present invention provides a surveying system, which comprises a laser scanner for scanning a predetermined measurement area by projecting a pulsed laser beam, for receiving a reflected light of the pulsed laser beam, for measuring three-dimensional position data of a projecting point of the pulsed laser beam for each pulse, and for acquiring a main point group of the measurement area, an auxiliary image pickup device being separated from the laser scanner and being able to acquire a supplementary image data from an arbitrary direction, and a surveying data processing device including a storage unit, an arithmetic control unit and a display unit, wherein a main point cloud data acquired by the laser scanner and a supplementary image data acquired by taking images of the range with no data acquired of the laser scanner from at least two directions by the auxiliary image pickup device are registered in the storage unit, and wherein the arithmetic control unit prepares a stereoscopic image based on the supplementary image data, acquires supplementary point cloud data on the range with data acquired, associates the supplementary point cloud data with the main point cloud data, and supplements the range with no data acquired of the main point cloud data by the supplementary point cloud data. Also, the present invention provides a surveying system as described above, wherein the laser scanner comprises a main image pickup device for acquiring a main image data by taking an image of the measurement area on an image pickup light optical axis coaxial with the projection light optical axis of a pulsed laser beam. Further, the present invention provides a surveying system as described above, wherein the association of the supplementary point cloud data with the main point cloud data is performed by association of reference points selected from the main point cloud data and points in the supplementary point cloud data corresponding to the reference points. Also, the present invention provides a surveying system as described above, wherein the main image data taken by the main image pickup device is associated with the main point cloud data and is registered in the surveying data processing device together with the main point cloud data, wherein the surveying data processing device associates the main point cloud data with the supplementary point cloud data through image matching of the main image data and the supplementary image data. Further, the present invention provides a surveying system as described above, wherein the arithmetic control unit displays individually on the display unit at least the main point cloud data among the main image data, the main point cloud data, the supplementary image data and the supplementary point cloud data.

Also, the present invention provides a surveying data processing program, for executing a step to detect a range with no data acquired in main point cloud data on a predetermined measurement area obtained by a laser scanner, a step to calculate supplementary point cloud data of the range with no data acquired based on supplementary image data of the range with no data acquired from at least two directions taken by an auxiliary image pickup device, a step to perform matching of the main point cloud data and the supplementary point cloud data, and a step to supplement the range with no data acquired of the main point cloud data by the supplementary point cloud data. Further, the present invention provides the surveying data processing program as described above, wherein the step to perform matching of the main point cloud data with the supplementary point cloud data is executed by a step to select adequate reference points from the main point cloud data, a step to select points in the supplementary point cloud data corresponding to the reference points, and a step to perform association of the selected reference points and the corresponding points. Also, the present invention provides the surveying data processing program as described above, wherein the range with no data acquired is identified by detection of a boundary where adjacent point data on the inner side is lacking in the main point cloud data. Further, the present invention provides the surveying data processing program as described above, wherein the step to perform matching of the main point cloud data with the supplementary point cloud data is executed by a step to perform image matching of an image data of the measurement area associated with the main point cloud data and the supplementary image data of the range with no data acquired. Also, the present invention provides the surveying data processing program as described above, wherein, among the main image data acquiring the measurement area coaxial with a measuring light optical axis by a main image pickup device disposed on the laser scanner, the main point cloud data, the supplementary image data and the supplementary point cloud data, at least the main point cloud data is individually displayed.

According to the present invention, there are provided a step of acquiring a main point cloud data on a predetermined measurement range by a laser scanner, a step of detecting a range with no data acquired, a step of acquiring a supplementary image data of the range with no data acquired by an auxiliary image pickup device, a step of preparing a stereoscopic image based on the supplementary image data obtained by the auxiliary image pickup device, a step of acquiring supplementary point cloud data from the stereoscopic image, and a step of supplementing the range with no data acquired of the main point cloud data by matching of the main point cloud data and the supplementary point cloud data. As a result, for the range with no data acquired, in which the data cannot be obtained by the laser scanner, the data can be easily obtained, and the point cloud data with no data-lacking portion can be acquired.

Also, according to the present invention, the laser scanner acquires the point cloud data and a main image data associated with the point cloud data. As a result, the range with no data acquired can be visually identified by displaying the main image data together with the point cloud data.

Further, according to the present invention, the matching of the main point cloud data and the supplementary point cloud data is performed by association of reference points adequately selected from the main point cloud data and points in the supplementary point cloud data corresponding to the reference points. The main point cloud data has three-dimensional data, and there is no need to perform surveying operation for the supplementary point cloud data.

Also, according to the present invention, the matching of the main point cloud data and the supplementary point cloud data is performed by image matching of the main image data and the supplementary image data. This makes it possible to perform the matching in simpler and easier manner.

Further, according to the present invention, the range with no data acquired is identified by displaying the main point cloud data in a display unit. As a result, the range with no data acquired can be visually identified.

Also, according to the present invention, the range with no data acquired is identified by detecting a boundary where adjacent point data on the inner side is lacking in the main point cloud data. This makes possible automatical detection by data operation.

Further, according to the present invention, a laser scanner for scanning a predetermined measurement area by projecting a pulsed laser beam, for receiving a reflected light of the pulsed laser beam, for measuring three-dimensional position data of a projecting point of the pulsed laser beam for each pulse, and for acquiring a main point group of the measurement area, an auxiliary image pickup device being separated from the laser scanner and being able to acquire a supplementary image data from an arbitrary direction, and a surveying data processing device including a storage unit, an arithmetic control unit and a display unit, and a main point cloud data acquired by the laser scanner and a supplementary image data acquired by taking images of the range with no data acquired of the laser scanner from at least two directions by the auxiliary image pickup device are registered in the storage unit, and the arithmetic control unit prepares stereoscopic image based on the supplementary image data, acquires supplementary point cloud data on the range with data acquired, associates the supplementary point cloud data with the main point cloud data, and supplements the range with no data acquired of the main point cloud data by the supplementary point cloud data. As a result, for the range with no data acquired, in which the data cannot be obtained by the laser scanner, the data can be easily obtained and the point cloud data with no data-lacking portion can be acquired.

Also, according to the present invention, the laser scanner comprises a main image pickup device for acquiring a main image data by taking an image of the measurement area on an image pickup light optical axis coaxial with a projection light optical axis of the pulsed laser beam. As a result, the main image data and the main point cloud data can be easily associated with each other.

Further, according to the present invention, the association of the supplementary point cloud data with the main point cloud data is performed by association of reference points selected from the main point cloud data and points in the supplementary point cloud data corresponding to the reference points. This makes it possible to execute the processing in easier manner without performing measurement on the supplementary point cloud data.

Also, according to the present invention, the main image data taken by the main image pickup device is associated with the main point cloud data and is registered in the surveying data processing device together with the main point cloud data, and the surveying data processing device associates the main point cloud data with the supplementary point cloud data through image matching of the main image data and the supplementary image data. As a result, there is no need to perform matching on the point data each other, and the processing can be simplified.

Further, according to the present invention, the arithmetic control unit displays individually on the display unit at least the main point cloud data among the main image data, the main point cloud data, the supplementary image data and the supplementary point cloud data. Thus, it is possible to display the main point cloud data and the main image data under the condition as overlapped on each other and to visually identify the range with no data acquired.

Also, according to the present invention, a surveying data processing program executes a step to detect a range with no data acquired in main point cloud data on a predetermined measurement area obtained by a laser scanner, a step to calculate supplementary point cloud data of the range with no data acquired based on supplementary image data of the range with no data acquired from at least two directions taken by an auxiliary image pickup device, a step to perform matching of the main point cloud data and the supplementary point cloud data, and a step to supplement the range with no data acquired of the main point cloud data by the supplementary point cloud data. As a result, for the range with no data acquired, in which the data cannot be obtained by the laser scanner, the data can be easily obtained, and the point cloud data with no data-lacking portion can be acquired.

Further, according to the present invention, the step to perform matching of the main point cloud data with the supplementary point cloud data is executed by a step to select adequate reference points from the main point cloud data, a step to select points in the supplementary point cloud data corresponding to the reference points, and a step to perform association of the selected reference points and the corresponding points. Even when the supplementary point cloud data does not have three-dimensional data, processing can be carried out in easier manner without performing measurement on the supplementary point cloud data.

Also, according to the present invention, the range with no data acquired is identified by detection of a boundary where adjacent point data on the inner side is lacking in the main point cloud data. Thus, it is possible to automatically detect by data operation.

Further, according to the present invention, the step to perform matching of the main point cloud data with the supplementary point cloud data is executed by a step to perform image matching of an image data of the measurement area associated with the main point cloud data and the supplementary image data of the range with no data acquired. As a result, the processing can be easily carried out without performing the matching on the point data each other.

Also, according to the present invention, among main image data acquiring the measurement area coaxial with a measuring light optical axis by a main image pickup device disposed on the laser scanner, the main point cloud data, the supplementary image data and the supplementary point cloud data, at least the main point cloud data is individually displayed. As a result, for the range with no data acquired, in which data cannot be obtained by the laser scanner, the range can be visually identified.

BRIEF DESCRIPTION OF THE DRAWINGS

FIG. 10 is a flow chart to show a flow of preparation of three-dimensional data with an image in the laser scanner of the first example;

FIG. 15 represents drawings each showing the linking of the point cloud data in the third aspect of data acquisition;

DETAILED DESCRIPTION OF THE PREFERRED EMBODIMENT

Referring to the attached drawings, detailed description will be given below on the best mode when the present invention is carried out.

Figure 1:
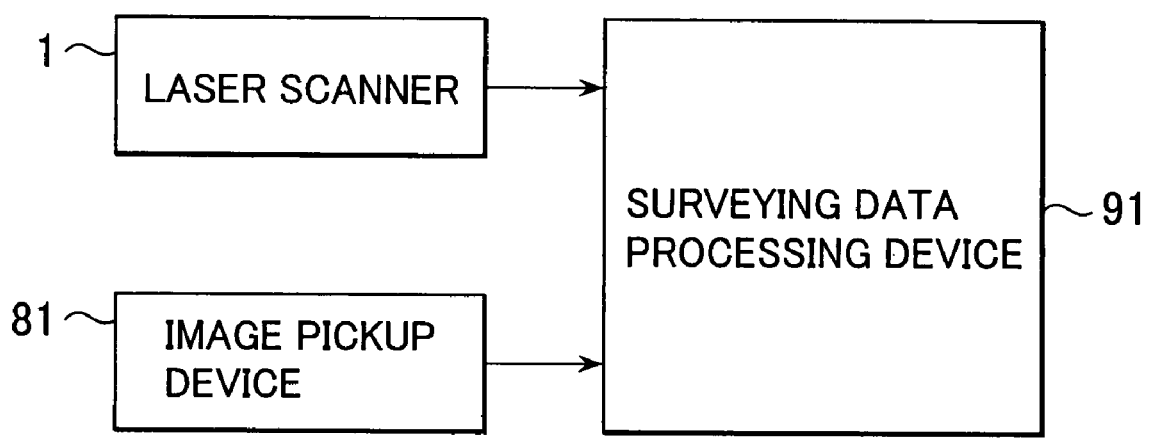
FIG. 1 is a schematical drawing to show an approximate arrangement of an embodiment of the present invention.

Referring to FIG. 1, description will be given below on a laser scanner used in the present invention.

As shown in FIG. 1, a surveying system according to the present invention generally comprises a laser scanner 1, an image pickup device 81 typically represented by a digital camera or the like, and a surveying data processing device 91.

First, referring to FIG. 2 to FIG. 17, description will be given on the laser scanner used in the invention.

Figure 2:
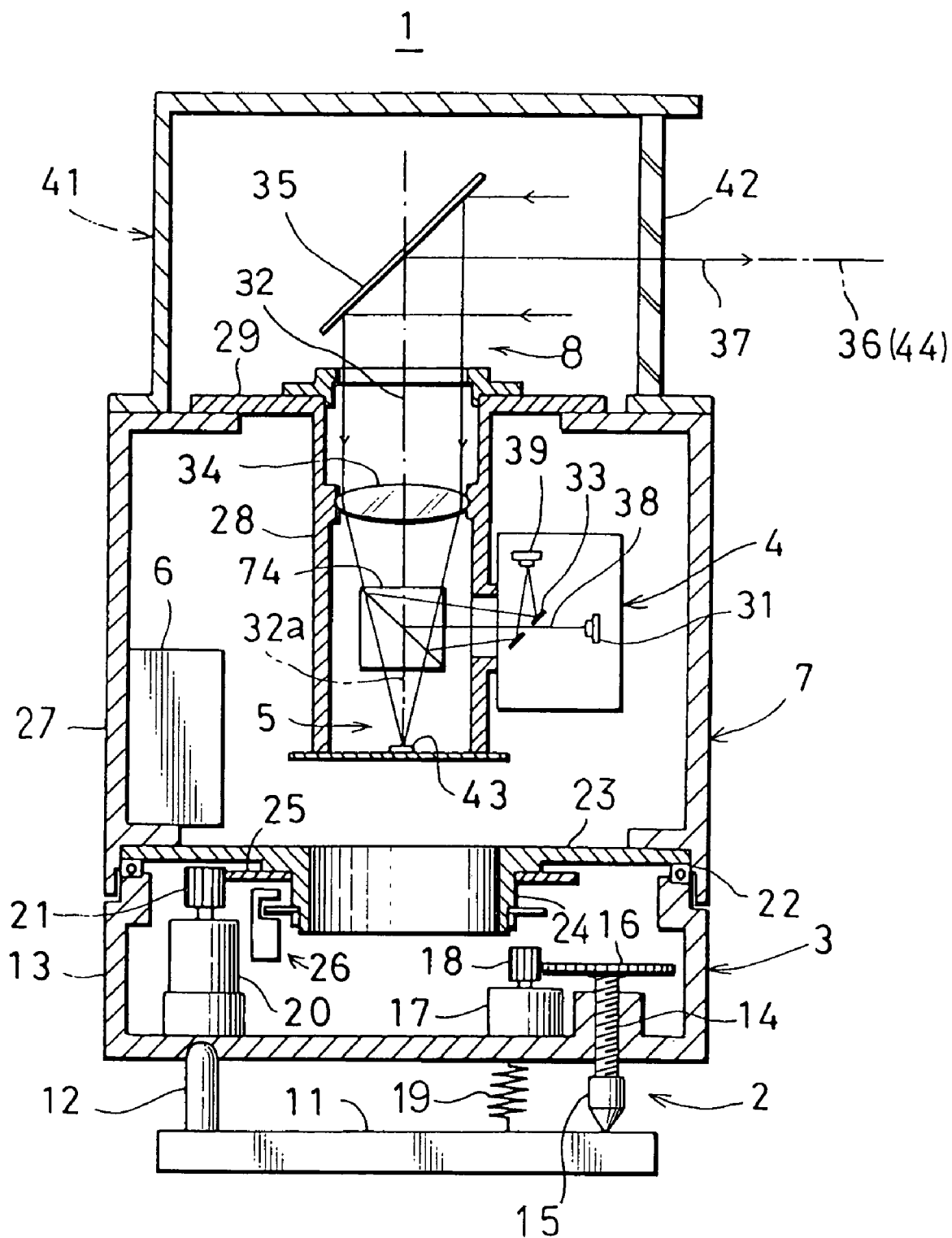
FIG. 2 is a cross-sectional view of a laser scanner in a first example of the present invention.
Figure 3:
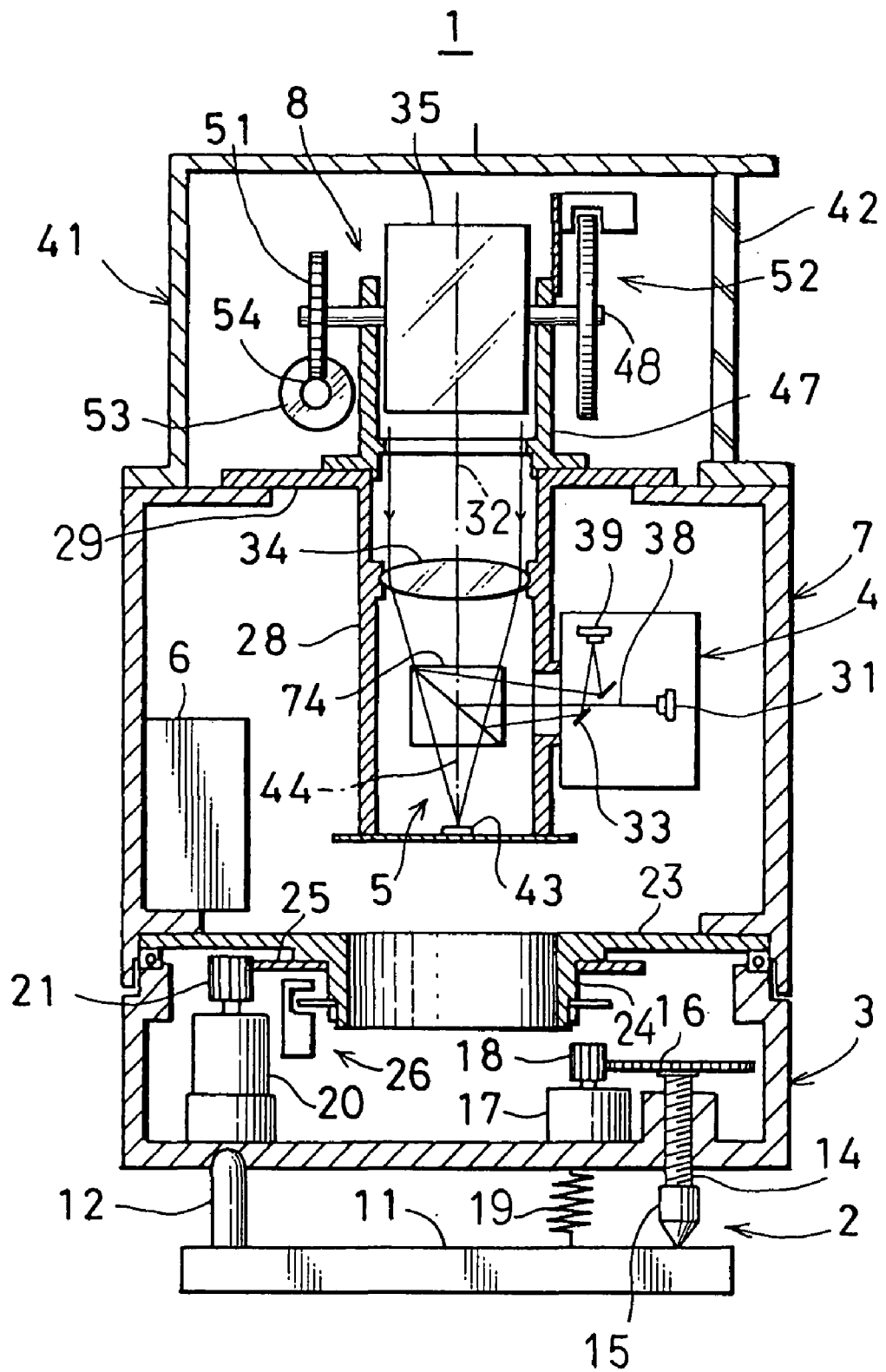
FIG. 3 is a cross-sectional view of the laser scanner of the first example of the invention with a part of the laser scanner being rotated.

FIG. 2 and FIG. 3 each represents a first example of the laser scanner.

The laser scanner 1 primarily comprises a leveling unit 2, a rotary mechanism 3 installed on the leveling unit 2, a measuring system main unit 7 supported by the rotary mechanism 3 and including a distance measuring unit 4, an image pickup unit 5, a control unit 6, etc., and a rotary projecting unit 8 mounted on an upper portion of the measuring system main unit 7. For convenience purpose, FIG. 2 shows a condition where only the rotary projecting unit 8 is seen from a lateral direction with respect to FIG. 1.

Now, description will be given on the leveling unit 2.

A pin 12 is erected on a base unit 11. An upper end of the pin 12 is designed with a curved surface and it is tiltably engaged in a depression portion on a bottom surface of a lower casing 13. At two other points on the bottom surface, adjusting screws 14 are screwed in and are penetrating through. On a lower end of each of the adjusting screws 14, a leg member 15 is fixed. The lower end of the leg member 15 is formed with a pointed end or with a curved surface and is abutted to the base unit 11. On an upper end of the adjusting screw 14, a leveling driven gear 16 is engaged. The lower casing 13 is supported on the base unit 11 at three points by the pin 12 and by the two adjusting screws 14 and so that the lower casing 13 can be tilted in any direction around the tip of the pin 12. A spring 19 is provided between the base unit 11 and the lower casing 13 so that the base unit 11 and the lower casing 13 are not separated from each other.

Inside the lower casing 13, two leveling motors 17 are disposed, and a leveling driving gear 18 is engaged with an output shaft of the leveling motor 17, and the leveling driving gear 18 is engaged with the leveling driven gear 16. The leveling motor 17 is driven independently by the control unit 6. By the driving of the leveling motor 17, the adjusting screws 14 are rotated via the leveling driving gear 18 and the leveling driven gear 16 so that the extent of the projection of the adjusting screw 14 in a downward direction can be adjusted. Also, inside the lower casing 13, a tilt sensor 56 (see FIG. 4) is mounted. The two leveling motors 17 are driven according to a detection signal from the tilt sensor 56, and leveling by the leveling unit 2 can be performed.

Description will be given now on the rotary mechanism 3.

The lower casing 13 also serves as a casing for the rotary mechanism 3. A horizontal rotating motor 20 is mounted in the lower casing 13, and a horizontal rotary driving gear 21 is mounted on an output shaft of the horizontal rotating motor 20.

The upper end of the lower casing 13 is designed in cylindrical shape. A rotary base 23 is provided on this upper end via a bearing 22. A rotation axis 24 projecting downward is arranged at the center of the rotary base 23. A horizontal rotary gear 25 is provided on the rotation axis 24, and the horizontal rotary driving gear 21 is engaged with the horizontal rotary gear 25.

On the rotation axis 24, a horizontal angle detector 26, e.g. an encoder, is disposed. By the horizontal angle detector 26, a relative rotation angle of the rotation axis 24 with respect to the lower casing 13 is detected. The results of the detection (horizontal angle) is inputted to the control unit 6. The driving of the horizontal rotating motor 20 is controlled by the control unit 6 based on the detection results.

Next, description will be given on the measuring system main unit 7.

A main unit casing 27 is fixed on the rotary base 23, and a body tube (lens barrel) 28 is disposed in the main unit casing 27. The body tube 28 has a centerline, which is coaxial with the rotation center of the main unit casing 27, and the body tube 28 is mounted on the main unit casing 27 by means as necessary. For instance, a flange 29 is formed on an upper end of the body tube 28, and the flange 29 is fixed on a ceiling of the main unit casing 27.

The body tube 28 has a main optical axis 32, which concurs with the central axis of the body tube 28, and a beam splitter 74, serving as an optical separating means, is provided on the main optical axis 32. The beam splitter 74 allows visible light to pass and reflects infrared light. A reflection light optical axis 38 and an image pickup light optical axis 44 are separated from the main optical axis 32 by the beam splitter 74.

The distance measuring unit 4 is arranged on the reflection light optical axis 38.

A light emitting element 31 is disposed on the reflection light optical axis 38, and an aperture mirror 33 is provided on the reflection light optical axis 38. The aperture mirror 33 branches off the reflection light optical axis 38, and a distance measuring light receiving unit 39 is disposed on the branched optical axis.

From the light emitting element 31, a pulsed laser beam is emitted. The light emitting element 31 is a semiconductor laser or the like, for instance. The light emitting element 31 emits a pulsed laser beam of infrared light as a distance measuring light 37, and the light emitting element 31 is controlled by the control unit 6 so that the pulsed laser beam is emitted under the condition as required. The pulsed laser beam passes through the aperture mirror 33 and is reflected toward an elevation rotary mirror 35 by the beam splitter 74. Then, the pulsed laser beam is projected to an object to be measured via the elevation rotary mirror 35. The elevation rotary mirror 35 is a deflecting optical member and is disposed on the main optical axis 32, and a condenser lens 34 is arranged on the main optical axis 32. The elevation rotary mirror 35 deflects the main optical axis 32, which runs in a vertical direction, to a projection light optical axis 36 running in a horizontal direction.

A reflected distance measuring light reflected from the object to be measured enters the distance measuring light receiving unit 39 via the elevation rotary mirror 35 and the aperture mirror 33. It is so designed that a divided part of the split distance measuring light 37 enters the distance measuring light receiving unit 39 as an internal reference light (not shown), and a distance to the object to be measured is determined based on the reflected distance measuring light and the internal reference light.

The light emitting element 31, the aperture mirror 33, the condenser lens 34, the elevation rotary mirror 35, the reflection light optical axis 38, etc. make up together the distance measuring unit 4.

An image receiving unit 43 is disposed on a transmission light optical axis 32a where the main optical axis 32 passes through the beam splitter 74, and the image receiving unit 43 is positioned at the bottom of the body tube 28.

The image receiving unit 43 is an aggregate of a multiple of pixels disposed on a plane, e.g. a CCD. The position of each pixel is specified around the transmission light optical axis 32a. To specify the position of each pixel, X-Y coordinates with the optical axis as its origin is assumed, and the position of each pixel is specified by X-coordinate and Y-coordinate. Further, an angle of a light beam entering the image receiving unit 43 is determined by the position of each pixel on the image receiving unit 43, and it is represented as a field angle (angle of view).

The elevation rotary mirror 35, the condenser lens 34, the image receiving unit 43, etc. make up together the image pickup unit 5.

An image pickup light from the object to be measured is entered to the elevation rotary mirror 35 along an image pickup light optical axis 44, which concurs with the projection light optical axis 36. After being reflected by the elevation rotary mirror 35, the image pickup light passes through the condenser lens 34 and the beam splitter 74 and is received by the image receiving unit 43, and an image is acquired.

Next, description will be given on the rotary projecting unit 8.

An upper casing 41 is mounted on an upper portion of the main unit casing 27, and a part of a side wall of the upper casing 41 is designed as a light projecting window 42. The rotary projecting unit 8 is accommodated within the upper casing 41.

On an upper end of the flange 29, a mirror holder 47 is mounted. The elevation rotary mirror 35 is rotatably mounted on the mirror holder 47 via a rotation shaft 48. An elevation rotary gear 51 is engaged on one of shaft ends of the elevation rotary mirror 35, and an elevation angle detector 52 is provided on the other of the shaft ends of the elevation rotary mirror 35. The elevation angle detector 52 detects a rotation angle (rotating position) of the elevation rotary mirror 35, and the result of detection is sent to the control unit 6.

An elevation rotating motor 53 is mounted on the mirror holder 47. An elevation rotary driving gear 54 is engaged on an output shaft of the elevation rotating motor 53, and the elevation rotary driving gear 54 is engaged with the elevation rotary gear 51. The driving of the elevation rotating motor 53 is controlled by the control unit 6 based on the result of detection by the elevation angle detector 52. The control unit 6 can drive and control the horizontal rotating motor 20 and the elevation rotating motor 53 independently or in synchronization.

Figure 4:
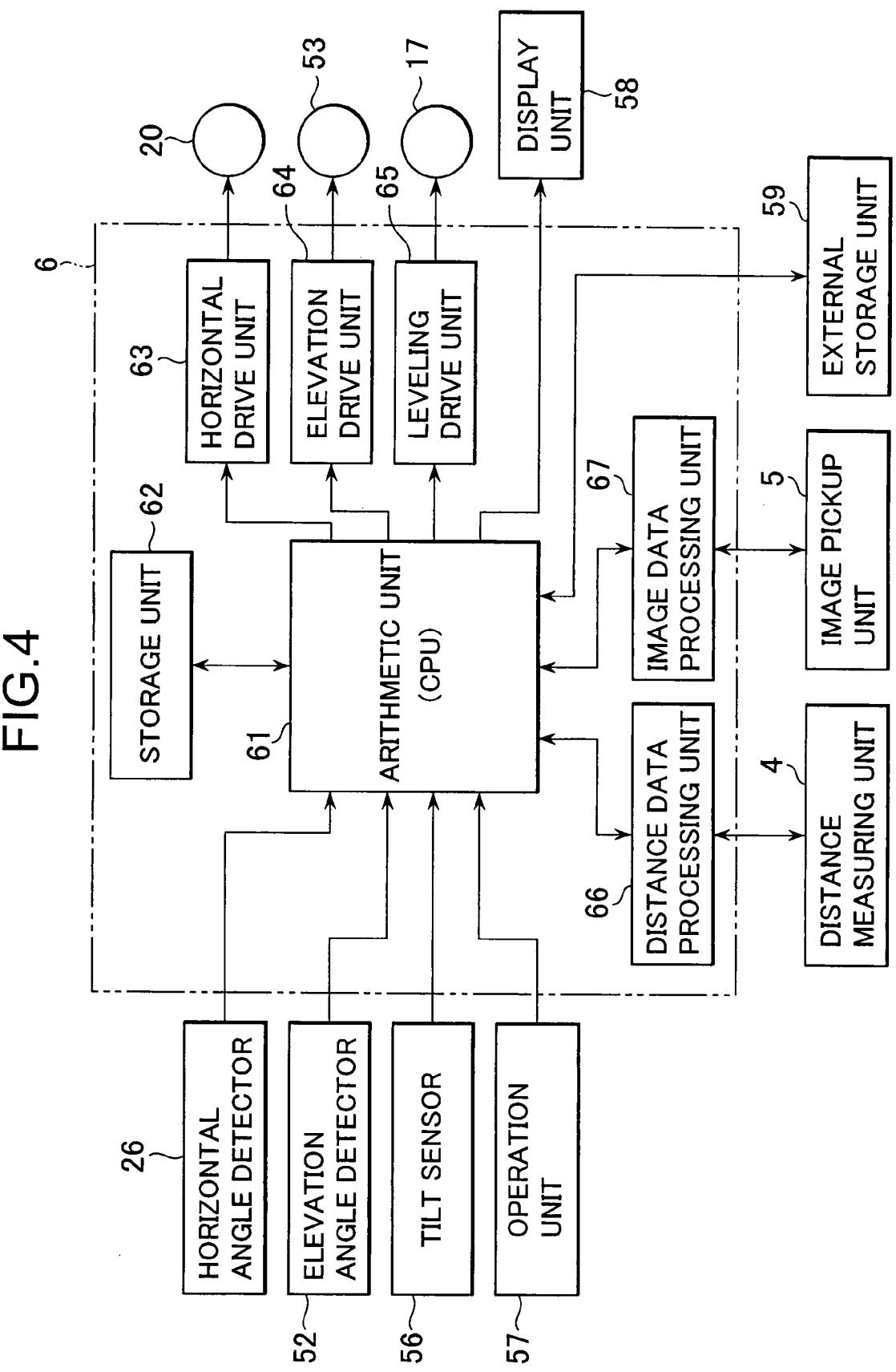
FIG. 4 is a block diagram to show an arrangement of the laser scanner in the first example of the invention.

Referring to FIG. 4, description will be given now on an arrangement of a control system of the laser scanner 1.

Signals from the horizontal angle detector 26, the elevation angle detector 52, and the tilt sensor 56 are inputted to the control unit 6, and it is so designed that the conditions necessary for starting the measurement of the laser scanner 1 and an instruction to start the measurement or the like can be inputted to the control unit 6 by a measurement operator from an operation unit 57. The operation unit 57 may be provided on a casing such as the main unit casing 27 or the like or may be provided independently.

The control unit 6 drives the horizontal rotating motor 20, the elevation rotating motor 53 and the leveling motor 17 and the control unit 6 also drives a display unit 58, which displays operating conditions, measurement results, etc. An external storage unit 59 such as a memory card, a HDD, etc. may be disposed on the control unit 6 or may be removably provided on it.

Next, general features of the control unit 6 will be described.

The control unit 6 comprises an arithmetic unit 61 typically represented by a CPU, and a storage unit 62 for storing various programs and the data such as measurement data, image data, etc. These programs include: a sequence program for controlling light emission of the light emitting element 31 and for controlling the leveling motor 17, the horizontal rotating motor 20, the elevation rotating motor 53, etc. in order to obtain surveying data necessary for distance measurement, for detection of an elevation angle and for detection of a horizontal angle; a computation program for calculating the obtained data and for acquiring the distance and three-dimensional data; a distance data program for processing distance data; an image processing program for the processing of image; an image display program for displaying the data on the display unit 58; a program for coordinating and managing these programs, and so on. The control unit 6 further comprises a horizontal drive unit 63 for driving and controlling the horizontal rotating motor 20, an elevation drive unit 64 for driving and controlling the elevation rotating motor 53, a leveling drive unit 65 for driving and controlling the leveling motor 17, a distance data processing unit 66 for processing the distance data obtained by the distance measuring unit 4, and an image data processing unit 67 for processing the image data obtained by the image pickup unit 5.

The arithmetic unit 61 executes necessary processings according to the sequence program, the computation program, the distance data program, the image processing program and the image display program.

The functions of the distance data processing unit 66 and the image data processing unit 67 may be executed by the arithmetic unit 61. In such case, the distance data processing unit 66 and the image data processing unit 67 need not be used. By separately providing the distance data processing unit 66 and the image data processing unit 67, the distance data processing and the image data processing can be executed in parallel, and this contributes to the accomplishment of the processing at higher speed.

The distance data processing unit 66 and the image data processing unit 67 may be provided separately. For instance, a personal computer (PC) 68 (see FIG. 5) may be prepared separately, and the functions of the distance data processing unit 66 and the image data processing unit 67 may be executed by the PC 68. In this case, the distance data and the image data may be stored in the external storage unit 59. After storing the data, the external storage unit 59 can be connected to the PC 68, and the distance data processing and the image data processing may be executed by the PC 68. It is also possible to transmit the data acquired by the laser scanner 1 to the PC 68 via communication means as required such as wireless LAN, etc. In this case, the external storage unit 59 may not be used.

Next, referring to FIG. 5 to FIG. 10, description will be given on the measuring operation by the laser scanner 1 and data preparation processing.

The laser scanner 1 is installed at a known point, and a measurement area 72 including an object to be measured 71 is approximately set up. In the figures, the object to be measured 71 is a natural topography including building(s).

The laser scanner 1 is faced rightly to the measurement area 72, and leveling is instructed from the operation unit 57.

The leveling motor 17 is driven via the leveling drive unit 65. Tilting of the laser scanner 1 is detected by the tilt sensor 56, and the result of detection by the tilt sensor 56 is fed back to the control unit 6. The adjusting screws 14 are rotated by the leveling motors 17 so that the tilt sensor 56 can detects horizontal position.

When leveling operation is completed, the completion of the leveling is displayed on the display unit 58 or is announced by means such as alarm sound, etc.

When the leveling operation is completed, an image of the measurement area 72 is taken. If the measurement area 72 is extending beyond the field angle (beyond a range taken by a single image pickup), the area is divided and images of each of the divided areas are picked up.

Figure 5:
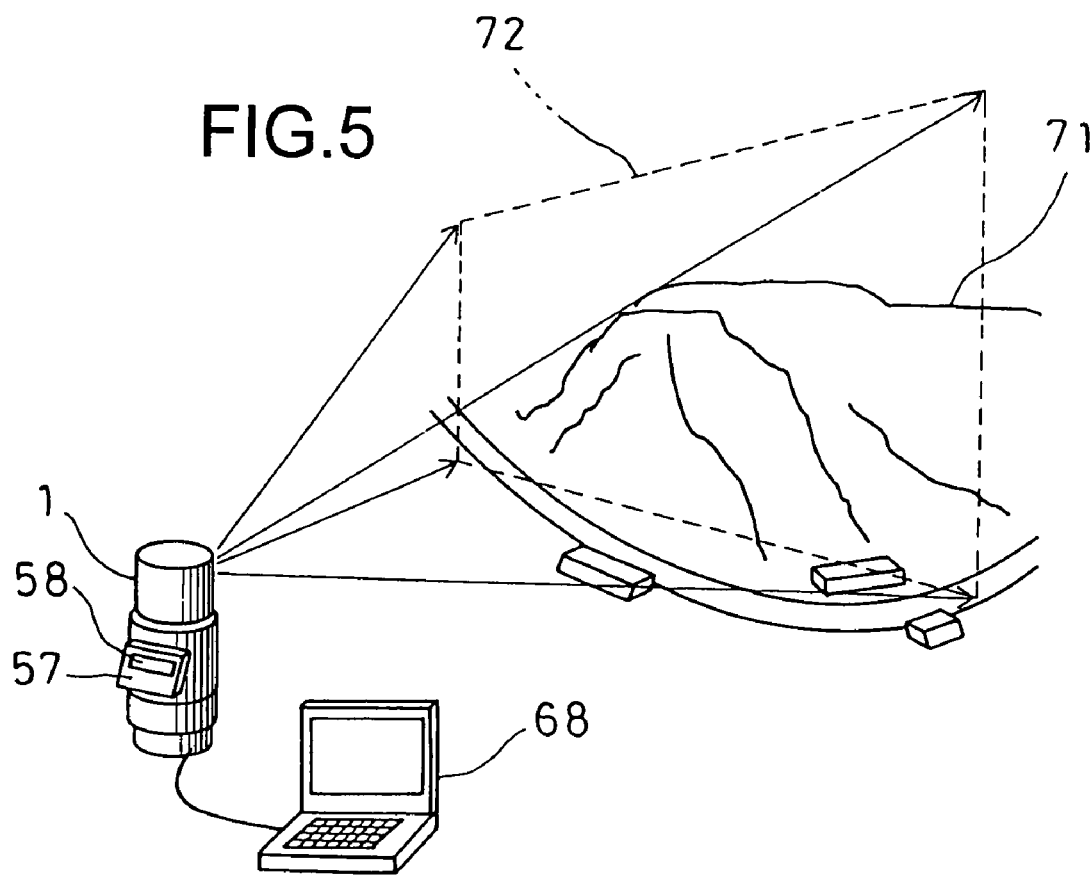
FIG. 5 is a schematical drawing to show a first aspect of data acquisition in the laser scanner of the first example of the invention.

First, referring to FIG. 5 and FIG. 6, description will be given on a case where the measurement area 72 is in a range, for which the image can be taken by a single image pickup.

An image of the measurement area 72 is taken, and digital image data of the measurement area 72 is acquired. The digital image data and the collimating direction when the image data has been acquired, i.e. the direction of the image pickup light optical axis 44 (horizontal angle; elevation angle), is stored in the storage unit 62.

The digital image data are an aggregate of signals of each pixels of the image receiving unit 43. The signal of each pixel has a signal, which specifies and identifies the position in the image receiving unit 43. At the position in the image receiving unit 43, the direction is identified with respect to the image pickup light optical axis 44. Therefore, the horizontal angle and the elevation angle of each pixel can be obtained based on the direction of the image pickup light optical axis 44 when the image of the measurement area 72 is acquired. Also, horizontal angle data and elevation angle data (address data) can be calculated for each pixel based on the image data stored in the storage unit 62.

The image of the measurement area 72 is displayed on the display unit 58, and a detailed measurement area 72' is set on the image. In case the detailed measurement area 72' is already set up according to the sequence program, there is no need to separately set up the detailed measurement area 72'.

The execution of distance measurement is instructed from the operation unit 57, or the execution of distance measurement is instructed according to the sequence program.

The posture of the elevation rotary mirror 35 is set up so that reflection surface of the elevation rotary mirror 35 faces to the light emitting element 31. The horizontal rotating motor 20 and the elevation rotating motor 53 are driven, and the measuring system main unit 7 is rotated in a horizontal direction, and the elevation rotary mirror 35 is rotated in an elevation (high-low) direction.

A distance measuring light is emitted as a pulsed beam from the light emitting element 31. The distance measuring light passes through the aperture of the aperture mirror 33 and is deflected by the elevation rotary mirror 35 and is projected along the projection light optical axis 36. The distance measuring light reflected by the object to be measured 71 is deflected by the elevation rotary mirror 35 to the main optical axis 32. The reflected distance measuring light is then reflected by the aperture mirror 33 and is received by the distance measuring light receiving unit 39.

The horizontal rotating motor 20 and the elevation rotating motor 53 are driven in synchronization, and a range of the measurement area 72 is scanned by the distance measuring light 37 with pulsed beam. At the distance measuring unit 4, a distance is measured for each pulse based on the reflected distance measuring light.

The distance data measured for each pulse is acquired. A detection horizontal angle detected by the horizontal angle detector 26 and an elevation angle detected by the elevation angle detector 52 when the pulsed beam is projected are acquired at the same time. Each distance data is interrelated and associated with the elevation angle data and the horizontal angle data, and the results are stored in the storage unit 62.

The horizontal angle relating to each pixel is equally corresponded with the horizontal angle associated with the distance data, and the relation between the elevation angle relating to each pixel and the elevation angle associated with distance measurement data is given as: (pixel elevation angle$-90°$)=(distance data elevation angle).

Here, the number of the distance data acquired is in the range from several millions to several tens of millions although it depends on the extension of the measurement area 72. By interrelating and associating the acquired distance data with the elevation angle data and the horizontal angle data, three-dimensional data of the measuring point can be determined.

The distance measuring unit 4 and the image pickup unit 5 are integrally mounted on the measuring system main unit 7 and are integrally rotated horizontally by the rotary mechanism 3. As a result, no positional deviation occurs between the distance data and the image data caused by the rotating. Further, the horizontal angle data and the elevation angle data for each pixel of the image data correspond to the elevation angle data and the horizontal angle data associated with the distance data at the ratio of 1:1. Accordingly, the distance data and the image data can be readily associated and interrelated according to the elevation angle data and the horizontal angle data.

With the completion of the scanning over the entire region of the detailed measurement area 72' by the distance measuring light 37, the acquisition of three-dimensional data (point cloud data) including image data, distance data, elevation angle data and horizontal angle data is completed.

Figure 7:
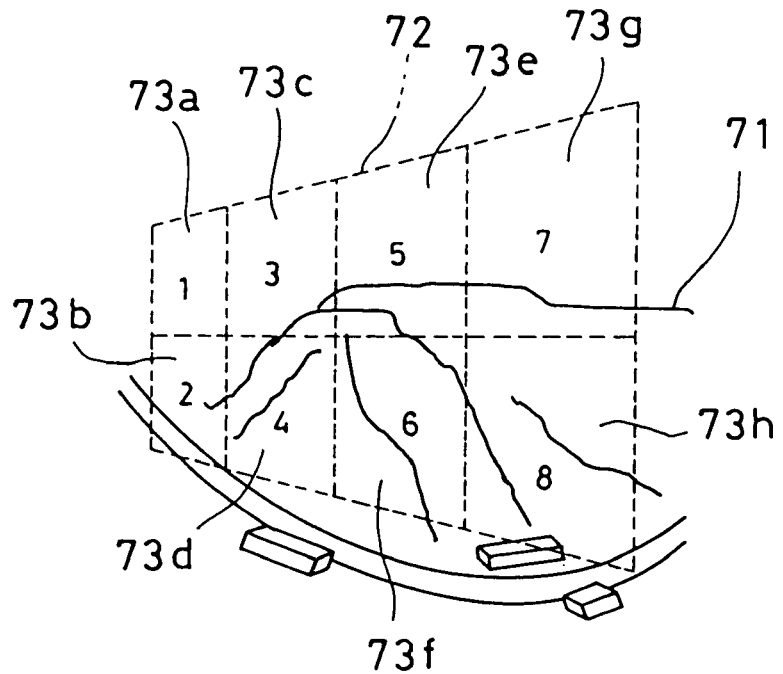
FIG. 7 is a schematical drawing to show a second aspect of data acquisition in the laser scanner of the first example of the invention.
Figure 8:
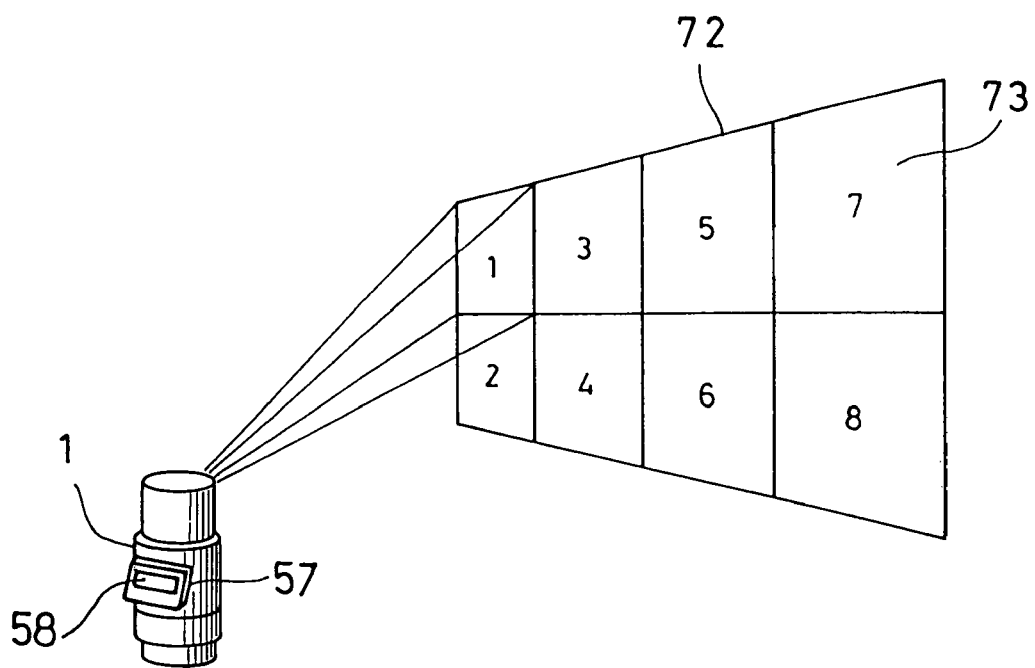
FIG. 8 is a schematical drawing to show the second aspect of data acquisition in the laser scanner of the first example of the invention.
Figure 9:
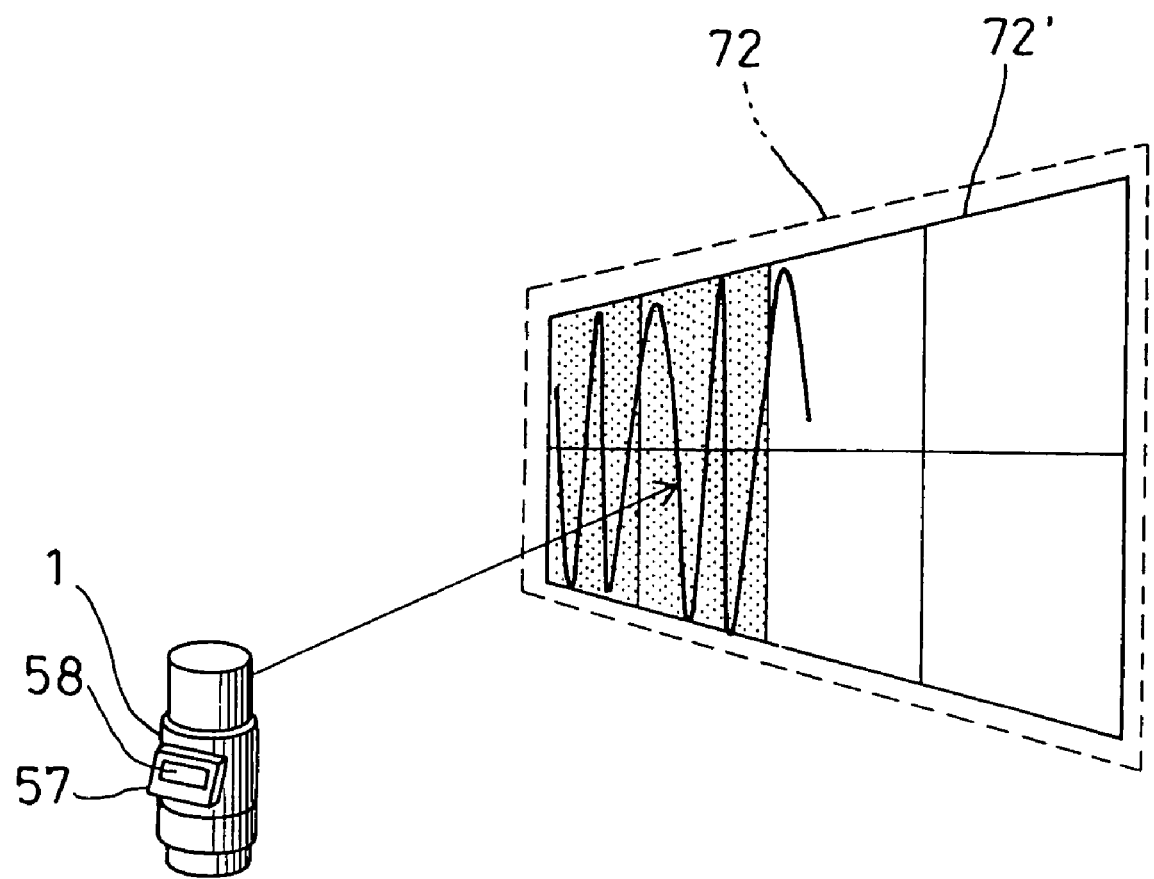
FIG. 9 is a schematical drawing to show the second aspect of data acquisition in the laser scanner of the first example of the invention.
Figure 11A:
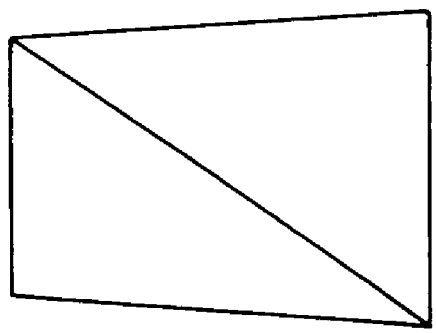
FIG. 11 (A), FIG. 11 (B), FIG. 11 (C) and FIG. 11 (D) each represents an aspect when point cloud data in the laser scanner of the first example is turned to TIN.
Figure 11B:
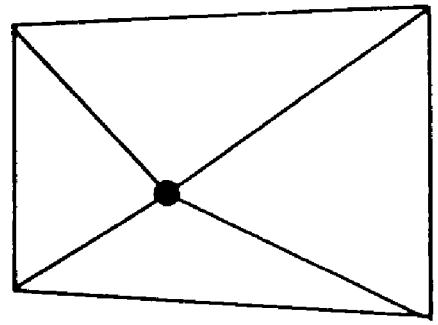
Figure 11C:
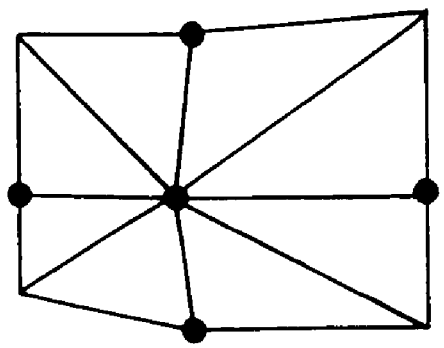
Figure 11D:
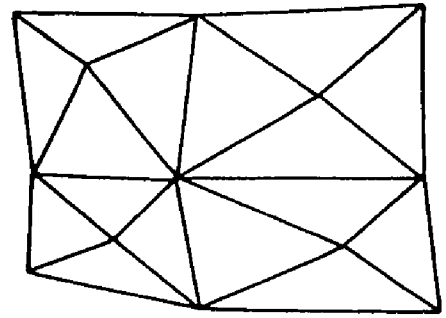

Next, when the measurement area 72 is extending beyond the field angle of the image pickup unit 5, i.e. beyond the range of a single image pickup, the measurement area 72 is divided and images are taken on the divided areas respectively as shown in FIG. 7 to FIG. 9. FIG. 7 shows a case where the measurement area 72 is divided into 8 divided areas.

When images are taken by dividing the measurement area, the image pickup direction is set on each of a first divided area 73a, a second divided area 73b, . . . , and an eighth divided area 73h. For the setting of the image pickup direction, the setting of the collimating direction, i.e. the setting of the horizontal angle and the setting of the elevation angle, is performed on each of the first divided area 73a-73h. Here, the horizontal angle and the elevation angle mean respectively the horizontal angle and the elevation angle of the image pickup light optical axis, i.e. the projection light optical axis 36.

The divided areas positioned adjacent to each other are set up in such manner that the required portions of the divided areas are overlapped on each other.

The execution of distance measurement is instructed from the operation unit 57, or the execution of distance measurement is instructed according to the sequence program.

The posture of the elevation rotary mirror 35 is set up so that the reflection surface of the elevation rotary mirror 35 faces to the image receiving unit 43. The horizontal rotating motor 20 and the elevation rotating motor 53 are driven. The measuring system main unit 7 is rotated in a horizontal direction, and the elevation rotary mirror 35 is rotated in an elevation (high-low) direction.

The horizontal angle detected by the horizontal angle detector 26 and the elevation angle detected by the elevation angle detector 52 are sent to the control unit 6 by feedback, and the horizontal rotating motor 20 and the elevation rotating motor 35 are controlled so that the projection light optical axis 36 concurs with the horizontal angle and the elevation angle of each of the divided areas 73a to 73h.

The horizontal angle and the elevation angle thus set up concur with the horizontal angle and the elevation angle detected by the horizontal angle detector 26 and the elevation angle detector 52 respectively for each of the divided areas 73a-73h. In this condition, images can be taken on each of the divided areas 73a-73h.

The divided images each corresponding to each of the divided areas 73a-73h are associated with the horizontal angle and the elevation angle respectively, and are stored as digital divided image data in the storage unit 62. Also, the divided images corresponding to the divided areas 73a-73h are combined by superimposing the overlapped portions, and the composite image thus combined is stored in the storage unit 62 as the image of the measurement area 72.

The digital divided image data corresponding to the divided areas 73a-73h are associated with the direction (horizontal angle and elevation angle) of the image pickup light optical axis 44, and the horizontal angle and the elevation angle of each pixel of the divided images can be determined based on the direction of the image pickup light optical axis 44. Therefore, over the entire region of the measurement area 72, the horizontal angle data and the elevation angle data (address data) can be calculated for each pixel.

The image of the measurement area 72 is displayed on the display unit 58, and the detailed measurement area 72' is set up on the image. In case the detailed measurement area 72' is already set up with respect to the measurement area 72 according to the sequence program, there is no need to separately set up the detailed measurement area 72'.

The execution of distance measurement is instructed from the operation unit 57, or the execution of distance measurement is instructed according to the sequence program. When the distance measurement is performed according to the sequence program, point cloud data of the detailed measurement area 72' can be acquired.

The distance measurement for the detailed measurement area 72' is the same as the distance measurement when the area is not divided, and detailed description is not given here.

Further, description will be given now on the processing for preparation of three-dimensional data with an image.

The processing is approximately the same in the case where the measurement area 72 is smaller than the range to be taken by a single image pickup operation and in the case where the measurement area 72 is divided to the divided areas and images are taken on each divided area respectively, and the divided images are combined.

(Step 01) When the preparation of three-dimensional data with an image of the divided areas is instructed from the operation unit 57, the programs necessary for preparing the three-dimensional data with an image such as the measurement sequence program, the computation program, the image processing program, etc. are started from the storage unit 62.

(Step 02) The measurement area 72 is approximately set up from the operation unit 57.

(Step 03) The image of the measurement area 72 is taken by the image pickup unit 5. When the field angle of the image pickup unit 5 is bigger than the measurement area 72, an image obtained by a single image pickup operation is stored as the image of the measurement area 72 in the storage unit 62. In the case the field angle of the image pickup unit 5 is smaller than the measurement area 72, the measurement area 72 is divided as many times as necessary. Then, an image is taken on each of the divided areas 73, and the images of the divided areas 73 are acquired. Each of the divided image data thus acquired is associated with the image pickup direction (the horizontal angle and the elevation angle of the projection light optical axis 36, i.e. the image pickup light optical axis 44), and is stored in the storage unit 62. Further, the divided image data are combined, and the combined image data is stored in the storage unit 62 as the image of the measurement area 72.

(Step 04) The image of the measurement area 72 is displayed on the display unit 58, and a measurement area (detailed measurement area 72') is set up in detail on the image of the measurement area 72.

(Step 05) Next, surveying is carried out within the detailed measurement area 72'. In the execution of surveying operation, when the object to be measured 71 is scanned by the pulsed distance measuring light within the range of the detailed measurement area 72', distance measurement is performed for each pulse (for each measuring point), and the distance measurement data for each measuring point is acquired. The elevation angle and the horizontal angle for each pulse are detected by the horizontal angle detector 26 and the elevation angle detector 52. The results of detection are incorporated from the horizontal angle detector 26 and the elevation angle detector 52 and are associated with each distance data and are stored in the storage unit 62.

(Step 06) The three-dimensional position data group at the measuring point is calculated according to the distance data at all of the measuring points and according to the elevation angle and the horizontal angle associated with each distance data, and three-dimensional position data group (point cloud data) for the detailed measurement area 72 is prepared.

(Step 07) The direction (horizontal angle and elevation angle) of the image pickup light optical axis 44 with respect to the image of the detailed measurement area 72' is already known, and the horizontal angle and the elevation angle of each pixel of the image data can be determined by calculation with reference to the image pickup light optical axis 44. Therefore, each pixel of the image data and each of the point cloud data can be associated with each other based on the elevation angle of the pixel. The image pickup light optical axis 44 of the image pickup unit 5 is coaxial with the distance measuring light optical axis (i.e. the projection light optical axis 36) of the distance measuring unit 4. Because the distance measuring unit 4 and the image pickup unit 5 are integrally rotated in a horizontal rotation, no deviation occurs in the positional relation between the image data and the point cloud data. Accordingly, in associating the image data with the three-dimensional data, there is no need to perform image processing such as optical axis alignment, rotation of image, etc. Also, there is no need to set up a reference point or the like on the object to be measured, and no need to extract the corresponding reference point from the image. Further, there is no need to extract the reference point from the image. Thus, no error occurs at the time of extracting.

(Step 08) As described above, the number of data in the point cloud data is in the range of several millions to several tens of millions. The point cloud data are turned to TIN (turned to undefined triangulation net), and it is possible to compress data or omit the data depending on the aspect of the process to turn to TIN. This reduces the burden on the arithmetic unit 61.

The undefined triangulation net comprises a triangle, which has three vertexes of the three-dimensional data. The size of the undefined triangle varies depending on whether three-dimensional data to be used as vertexes are selected coarsely or selected finely. FIG. 11 (A) shows a case where three-dimensional data are selected coarsely, and FIG. 11 (D) shows a case where three dimensional data are selected finely. FIG. 11 (B) and FIG. 11 (C) each represents a case somewhere in-between.

By turning to TIN, the three-dimensional data can be omitted (data can be compressed), which is included in the undefined triangle, when arithmetic operation is conducted. The calculation of positional data in the surface of the undefined triangule is described in JP-A-2004-163292.

By preparing several patterns for the case of the turning to TIN, the aspects of processing can be selected according to each condition while maintaining the acquired point cloud data among an aspect to perform high-speed processing by increasing data compression ratio, or an aspect to perform precise processing by decreasing data compression ratio, or other aspects.

(Step 09) Texture mapping is performed on the point cloud data turned to TIN and the image data. In this case, the elevation angle and the horizontal angle of the data of the vertexes of the undefined triangle when the data has been turned to TIN are already acquired. Also, the elevation angle and the horizontal angle of each pixel in the image data are already known. Thus, the vertexes of the undefined triangle can readily identify the pixels in the image data based on the elevation angle and the horizontal angle, and texture mapping of the point cloud data and the image data can be easily conducted.

(Step 10) By the texture mapping of the point cloud data and the image data, three-dimensional data with an image can be prepared.

The image data and the point cloud data associated and prepared in Step 07, and the interrelation and association between each pixel and each of the point cloud data are stored in the storage unit 62 or in the external storage unit 59 as data file, and this is utilized in the subsequent processing such as the linking of data at a later time (Step 21).

Next, description will be given on a case where measurement is made on a plurality of measurement areas 72 by the laser scanner 1 and the three-dimensional data with image is prepared for each measurement area 72 and the three-dimensional data with image of the plurality of measurement areas 72 are connected (joined) together. When the connecting is made on the three-dimensional data with image of the plurality of measurement areas 72, the images of the measurement areas 72 are acquired under the condition that the portions of the images of the measurement areas 72 are overlapped on each other.

Figure 12:
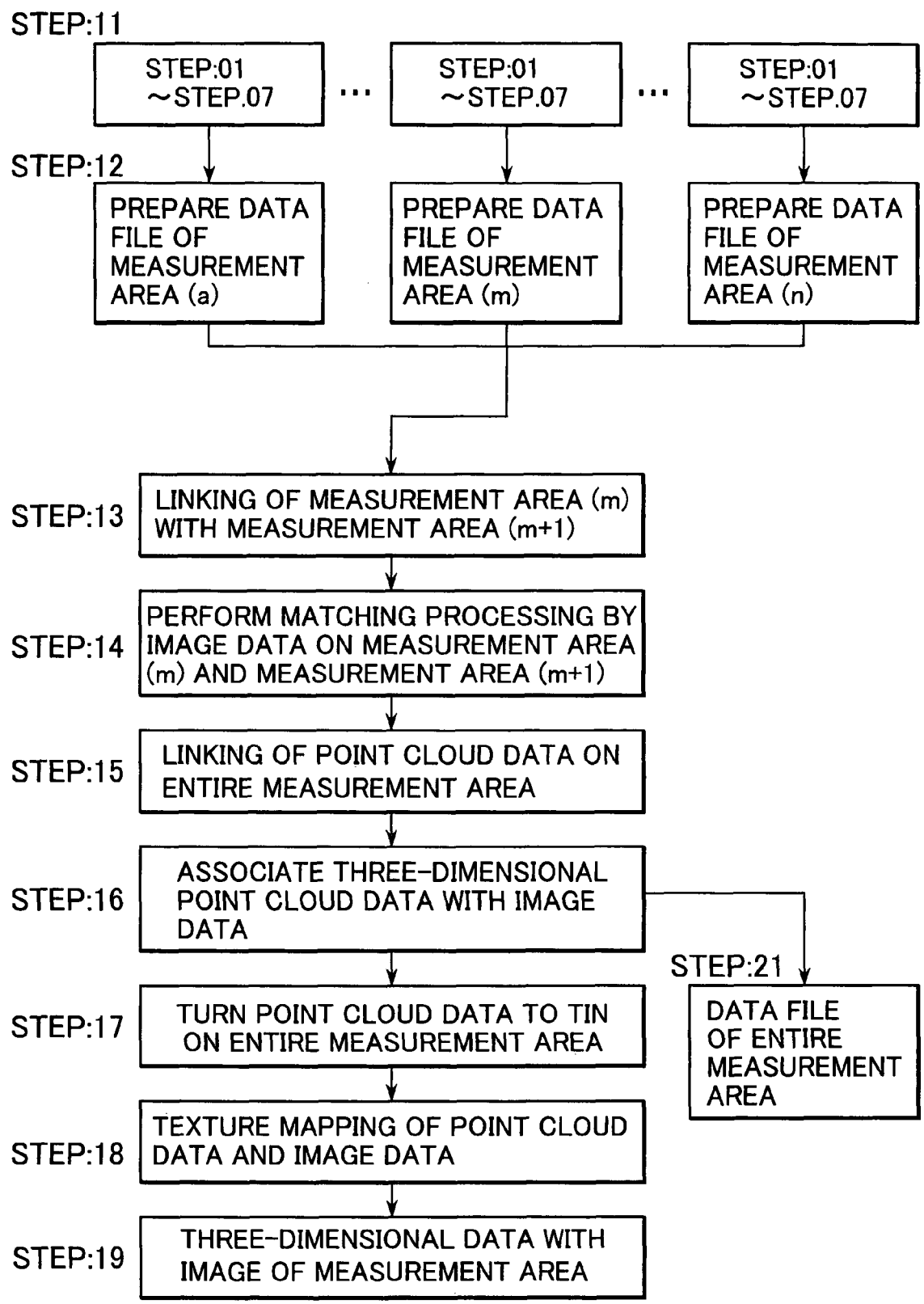
FIG. 12 is a flow chart to show the linking of the image data and the point cloud data in a plurality of measurement areas.

Referring to FIG. 12, description will be given on the case where the three-dimensional data with image prepared on a plurality of measurement areas 72 are linked together. The case given below is a case where the three-dimensional data with image are prepared on a plurality of measurement areas 72 without changing the installation position of the laser scanner 1.

(Step 11) The procedures of Step 01 to Step 07 shown in FIG. 10 are performed on each of a measurement area 72a, a measurement area 72b, ..., and a measurement area 72n. The image data and three-dimensional data are acquired respectively, and the three-dimensional data are associated with the image data.

For the image data on each of the measurement area 72a, the measurement area 72b, ..., and the measurement area 72n, the range of image pickup is set up in such manner that the image data of the images adjacent to each other are overlapped on each other in a certain amount as required.

(Step 12) For each of the measurement area 72a, the measurement area 72b, ..., and the measurement area 72n, a data file is prepared, which includes image data, three-dimensional data group, association information between the three-dimensional data and the image data, etc., and this is stored in the storage unit 62.

(Step 13) Linking is performed on the measurement area 72a, the measurement area 72b, ..., and the measurement area 72n, which are adjacent to each other.

(Step 14) In order to link the measurement area 72a, the measurement area 72b, ..., and the measurement area 72n, which are positioned adjacent to each other, the linking can be conducted by connecting (joining) the image data with each other. For the connecting of the image data, the portions overlapped on each other are superimposed together, and through the matching of the superimposed portions, the image data are connected together. In the matching of the superimposed portions, the matching can be readily performed when the installation position of the laser scanner 1 is not changed.

(Step 15) Three-dimensional data are associated for each pixel of the image. Through the connecting of the images, the linking of the point cloud data can also be conducted. Further, by executing the connecting of images on all of the measurement area 72a, the measurement area 72b, ..., and the measurement area 72n, the linking of the point cloud data of the measurement area 72a, the measurement area 72b, ..., and the measurement area 72n can be completed.

(Step 16) By carrying out the connecting of the image data and the linking of the point cloud data on all of the measurement area 72a, the measurement area 72b, ... and the measurement area 72n, the image data are acquired and the point cloud data are acquired for the whole range of the plurality of the measurement areas including the measurement area 72a, the measurement area 72b, ..., and the measurement area 72n, and the image data can be associated with the point cloud data for all of the measurement area 72a, the measurement area 72b, ..., and the measurement area 72n.

(Step 17) For the whole range of the measurement area 72a, the measurement area 72b, ..., and the measurement area 72n, the point cloud data are turned to TIN.

The procedure to turn the point cloud data to TIN is performed in the same manner as described in Step 08. Data compression and data omission are conducted, and the burden on the arithmetic unit 61 can be reduced.

(Step 18) By the procedure similar to the procedure described in Step 09, texture mapping is performed on the point cloud data turned to TIN and the image data.

(Step 19) By the same procedure as in Step 10, texture mapping of the point cloud data and the image data is conducted, and three-dimensional data with image are prepared for the whole range of the measurement area 72a, the measurement area 72b, ..., and the measurement area 72n.

The image data, the point cloud data and the association of each pixel with each of the point cloud data, which are associated and prepared in Step 16, are stored as a data file in the storage unit 62 or in the external storage unit 59. This is utilized in the subsequent processing such as the linking of data (Step 21).

Figure 13:
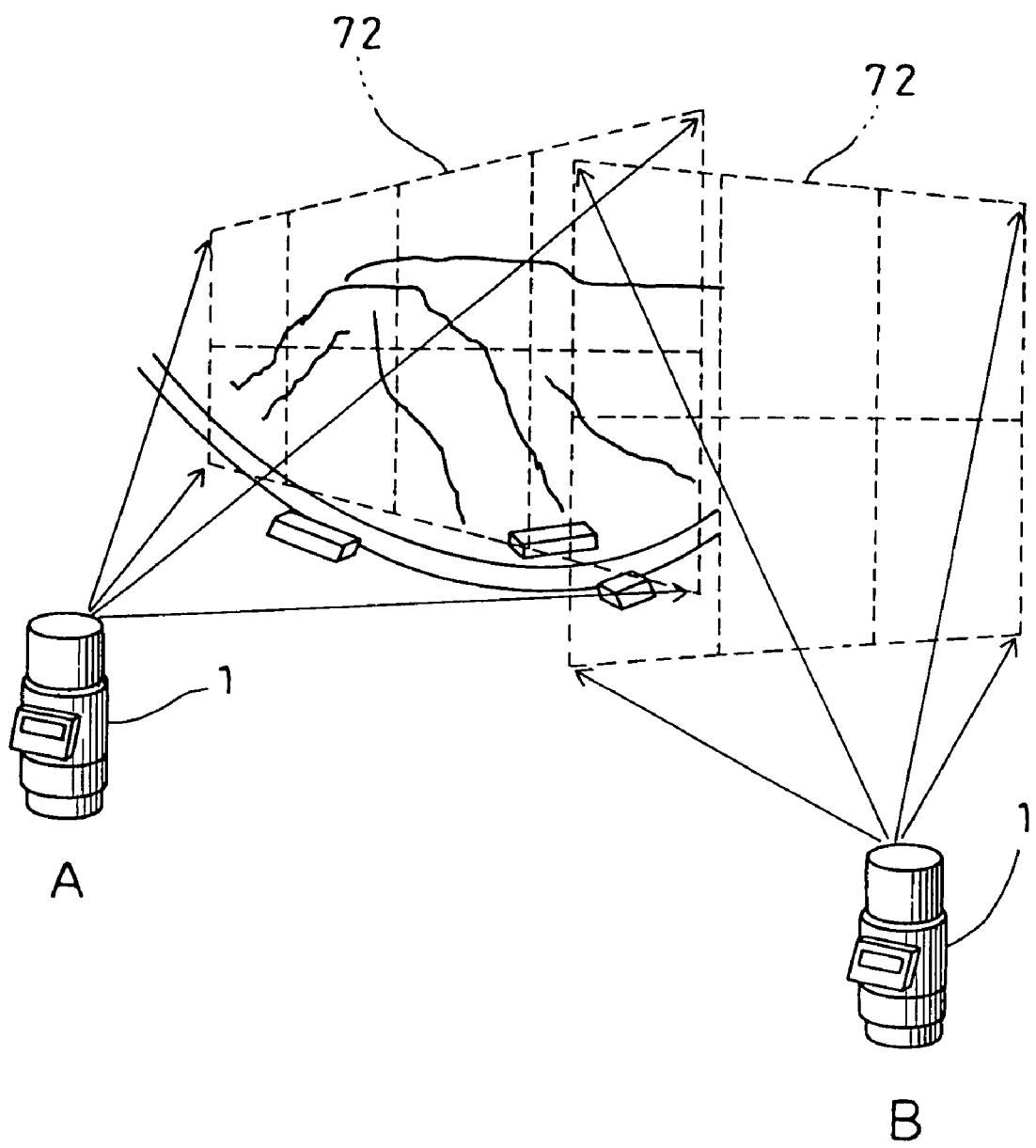
FIG. 13 is a schematical drawing to show a third aspect of data acquisition in the laser scanner of the first example.

Next, referring to FIG. 13 and FIG. 14, description will be given on the connecting of a plurality of the images with three-dimensional data acquired when the installation position of the laser scanner 1 is changed.

The laser scanner 1 is installed at a Point A, and image data and point cloud data are acquired on a first measurement area 72-1 from the Point A. Then, the laser scanner 1 is moved and is installed at a Point B, and image data and point cloud data are acquired on a second measurement area 72-2 from the Point B.

Figure 6:
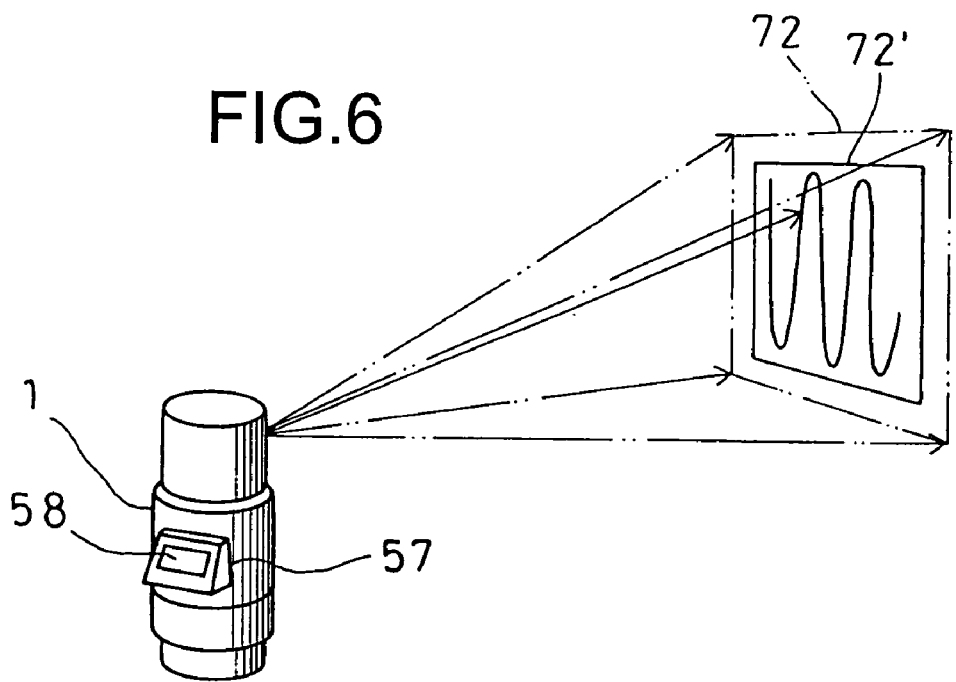
FIG. 6 is a schematical drawing to show the first aspect of data acquisition in the laser scanner of the first example of the invention.

When the first measurement area 72-1 or the second measurement area 72-2 is smaller than the field angle of the image pickup unit 5 of the laser scanner 1 as shown in FIG. 6, the image data of the measurement area can be acquired by a single image pickup operation. When the first measurement area 72-1 or the second measurement area 72-2 is larger than the field angle of the image pickup unit 5 as shown in FIG. 7 to FIG. 9, the measurement area 72 is divided, and the image data are acquired.

The image data of the first measurement area 72-1 and the image data of the second measurement area 72-2 are acquired by overlapping the required portions.

(Step 21) A data file of the measurement area is prepared on each of the first measurement area 72-1 and the second measurement area 72-2 through the processes of Step 01 to Step 07 as shown in FIG. 10.

(Step 22) Based on the data file of the first measurement area 72-1 and on the data file of the second measurement area 72-2, the data of the first measurement area 72-1 is combined with the data of the second measurement area 72-2.

(Step 23) As described above, the image data of the first measurement area 72-1 and the image data of the second measurement area 72-2 are partially overlapped on each other. Thus, matching is performed on the image data based on the overlapped portions.

For the matching of the image data, common points in the two images on the overlapped portions are extracted. Then, using one of the images as reference, coordinate transformation is performed on the other of the images so that the common points are concurred with each other. Further, to perform the image matching with high precision, the matching is conducted after coordinate transformation by using the least squares matching (LSM) which is a matching method to cope with effectively distortion of projection.

(Step 24) By performing the matching of the image data of the first measurement area 72-1 with the image data of the second measurement area 72-2, the image data of the first measurement area 72-1 is connected with the image data of the second measurement area 72-2. By connecting the images with each other, the point cloud data corresponding to the image data of the first measurement area 72-1 is linked with the point cloud data corresponding to the image data of the second measurement area 72-2. At the same time, the connected image data of the first measurement area 72-1 and the second measurement area 72-2 are associated with the linked point cloud data of the first measurement area 72-1 and the second measurement area 72-2.

FIG. 15 shows a condition where the point cloud data (A) and the point cloud data (B) are linked together and are combined to a point cloud data (C).

The connected image data and the linked point cloud data thus associated are stored in the storage unit 62 or in the external storage unit 59 as a composite data file of the first measurement area 72-1 and the second measurement area 72-2. The composite data files thus stored are utilized in the subsequent processing such as the linking of data and the like at a later time.

(Step 25) The point cloud data are turned to TIN. Through data compression and data omission, the burden on the arithmetic unit 61 can be reduced.

(Step 26) Texture mapping is performed on the point cloud data, which has been turned to TIN and the image data. In this case, the elevation angle and the horizontal angle on the data of the vertexes of the undefined triangle when turned to TIN are already acquired, and the elevation angle and the horizontal angle of each pixel in the image data are already known. Thus, for the vertexes of the undefined triangle, the pixels in the image data can be readily identified based on the elevation angle and the horizontal angle, and texture mapping of the point cloud data and the image data can be easily conducted.

(Step 27) By the texture mapping of the point cloud data and the image data, the three-dimensional data with image can be prepared.

Figure 14:
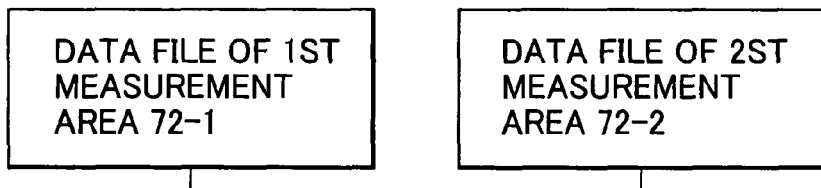
FIG. 14 is a flow chart to show the linking of the image data and the point cloud data in the third aspect of data acquisition.

By using two or more data files of the entire measurement area obtained in Step 21 of FIG. 12 or by using two or more composite data files obtained in Step 31 of FIG. 14, the data are linked, and three-dimensional data with image for wider range can be prepared.

Figure 16:
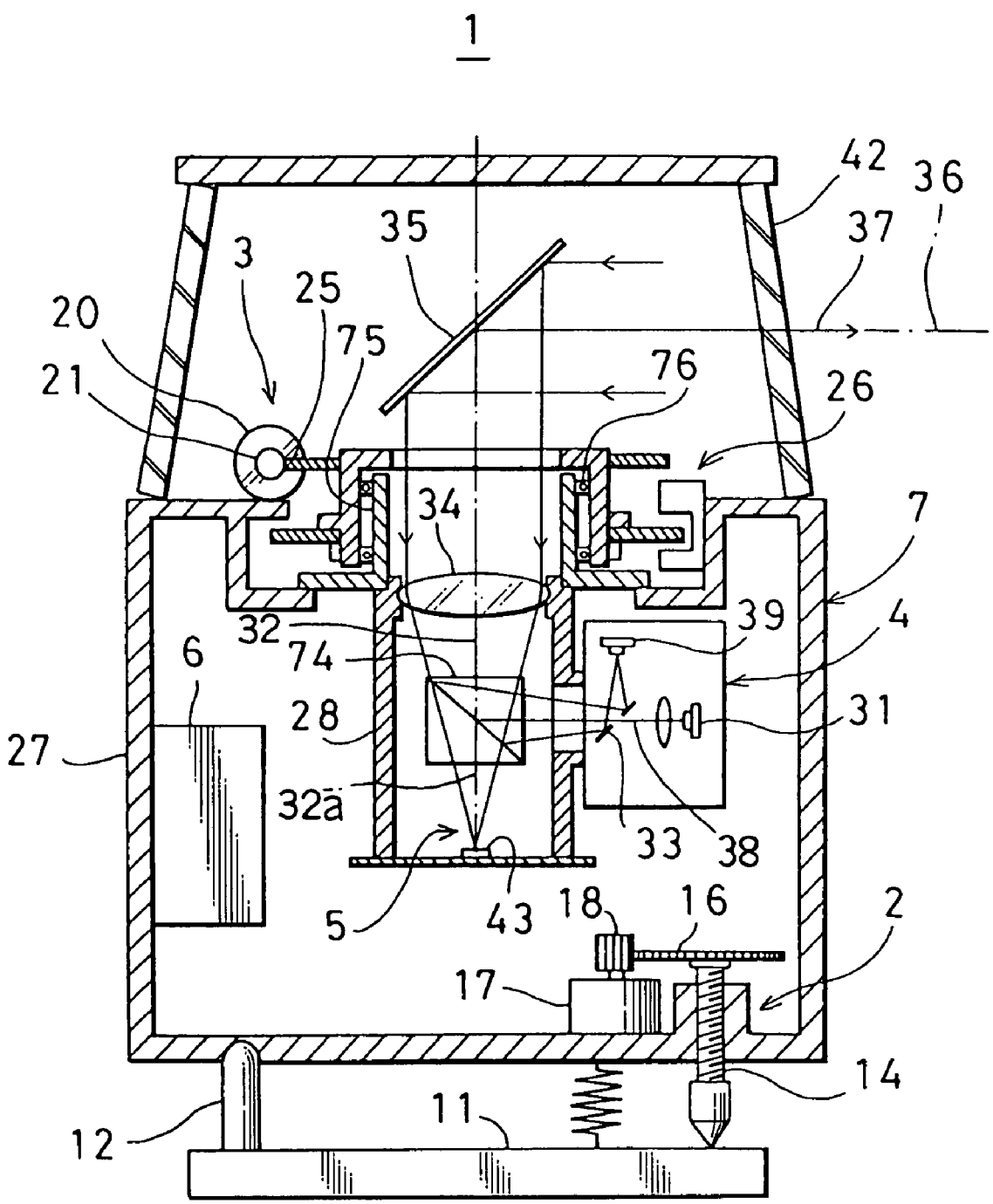
FIG. 16 is a cross-sectional view of a laser scanner in a second example of the invention.
Figure 17:
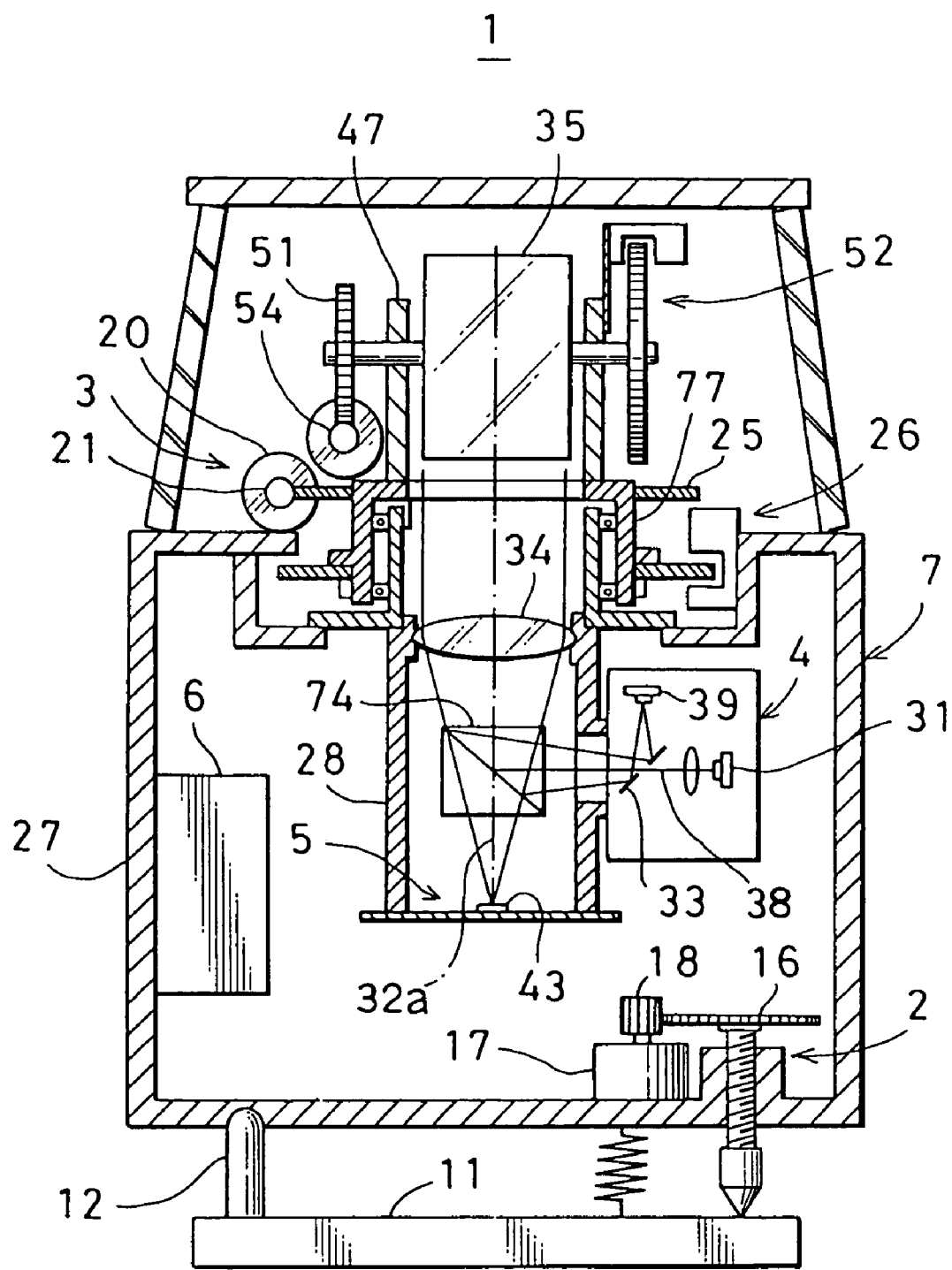
FIG. 17 is a cross-sectional view of the laser scanner in the second example of the invention with a part of the laser scanner being rotated.

FIG. 16 and FIG. 17 each represents a second example of the laser scanner 1 according to the present invention. The relation between the FIG. 16 and FIG. 17 is similar to the relation between FIG. 2 and FIG. 3. In FIG. 16 and FIG. 17, the same component in FIG. 2 or FIG. 3 is referred by the same symbol, and detailed description is not given here.

In the second example, the image pickup optical system, the distance measuring light optical system, the leveling unit 2, the rotary mechanism 3, the rotary projecting unit 8, etc. have similar mechanisms to those described in the first example.

An infrared light is used as a distance measuring light. A light emitting element 31 emits a pulsed laser beam of infrared light.

A beam splitter 74, which is an optical separating means, is disposed inside the body tube 28 and on the main optical axis 32. The beam splitter 74 allows a visible light to pass and reflects an infrared light. By the beam splitter 74, a reflection light optical axis 38 is separated from the main optical axis 32.

A distance measuring light 37 emitted from the light emitting element 31 is reflected along the main optical axis 32 by the beam splitter 74 and is projected along the projection light optical axis 36 by the elevation rotary mirror 35.

The reflected distance measuring light reflected along the projection light optical axis 36 is reflected by the elevation rotary mirror 35, the beam splitter 74 and the aperture mirror 33. The reflected distance measuring light is then received by the distance measuring light receiving unit 39, and a distance is measured.

An image pickup light from the object to be measured is reflected by the elevation rotary mirror 35. Then, the image pickup light passes through the beam splitter 74 and is received by the image receiving unit 43, and an image is acquired.

In the laser scanner 1 of the second example also, the image pickup light optical axis is coaxial with the distance measuring light optical axis. Because the distance measuring unit 4 and the image pickup unit 5 are integrally rotated, the point cloud data and the image data can be easily associated. With respect to the elevation rotary mirror 35, the projection light optical axis 36 concurs with the image pickup light optical axis 44, and the point cloud data can be easily associated with the image data.

In the above, infrared light is used as a laser beam, while a laser beam of red color or green color may be used when visual confirmation of the projecting point is needed.

The image pickup device 81 (see FIG. 1) is preferably a device, by which the picked-up image can be obtained as digital data. For instance, a digital camera is used as this device. An image taken on a film or the like may be converted to digital data.

The image pickup device 81 can store image data, and a portable storage medium is removably mounted on the image pickup device 81. As the storage medium, a memory card is used, for instance. An image data can be inputted to the surveying data processing device 91 via the memory card.

Figure 18:
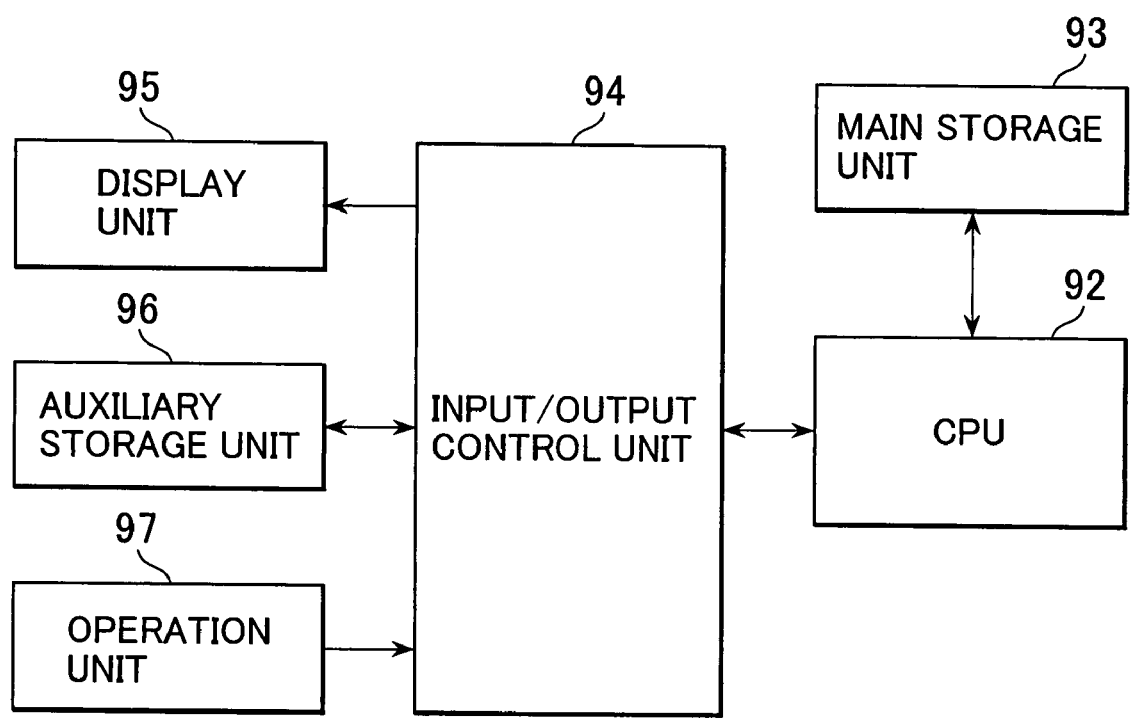
FIG. 18 is a schematical block diagram of a surveying data processing system of the present invention.

Referring to FIG. 18, description will be given on general features of the surveying data processing device 91.

The surveying data processing device 91 generally comprises an arithmetic control unit (CPU) 92, a main storage unit 93, an input/output control unit 94, a display unit 95, an auxiliary storage unit 96, and an operation unit 97.

A program storage region and a data storage region are formed in the main storage unit 93. In the program storage region, such programs are stored as an image processing program, a computation program for executing calculation as necessary, a surveying data processing program comprising a sequence program for managing and executing data processing, etc., and an image display program, etc. In the data storage region, a point cloud data acquired by the laser scanner 1, a main image data associated with the point cloud data, a supplementary image data acquired by the image pickup device 81, etc. are stored.

As the auxiliary storage unit 96, a memory card reader-writer, a DVD drive, a FD drive or a removable and portable HDD, etc. are used. The point cloud data and the main image data acquired by the laser scanner 1 are written in a recording medium such as a memory card, a DVD, an FD, etc. When the recording medium is loaded into the auxiliary storage unit 96 and is read, the data is written in the main storage unit 93. Or, the data is written in the portable HDD. The portable HDD is connected to the main storage unit 93. The data in the portable HDD are written to the main storage unit 93 via the arithmetic control unit 92.

In the case where the image pickup device 81 is a digital camera or the like which can acquire a picked-up image as an electronic data, a supplementary image thus taken and acquired is recorded in the memory card as digital data. When the memory card is loaded into the auxiliary storage unit 96, the supplementary image data can be stored in the main storage unit 93.

In the case where the image pickup device 81 is an analog type camera or the like for recording an image on a photosensitive film, the image is converted to an electronic data via an image scanner or the like. The converted electronic data is written in a memory card, a DVD, etc. By loading the memory card, DVD, etc. into the auxiliary storage unit 96, the supplementary image data can be stored in the main storage unit 93 in similar manner.

By connecting the laser scanner 1 and the surveying data processing device 91 via wireless LAN or the like, the data can be given and taken between the laser scanner 1 and the surveying data processing device 91 via radio communication as a recording medium and without giving or taking any physical recording medium.

The operation unit 97 is typically represented by a keyboard, a mouse, etc., for instance. From the operation unit 97, a measurement operator inputs conditions for surveying operation and gives instructions as necessary such as starting of measurement, etc. to the arithmetic control unit 92.

Figure 19:
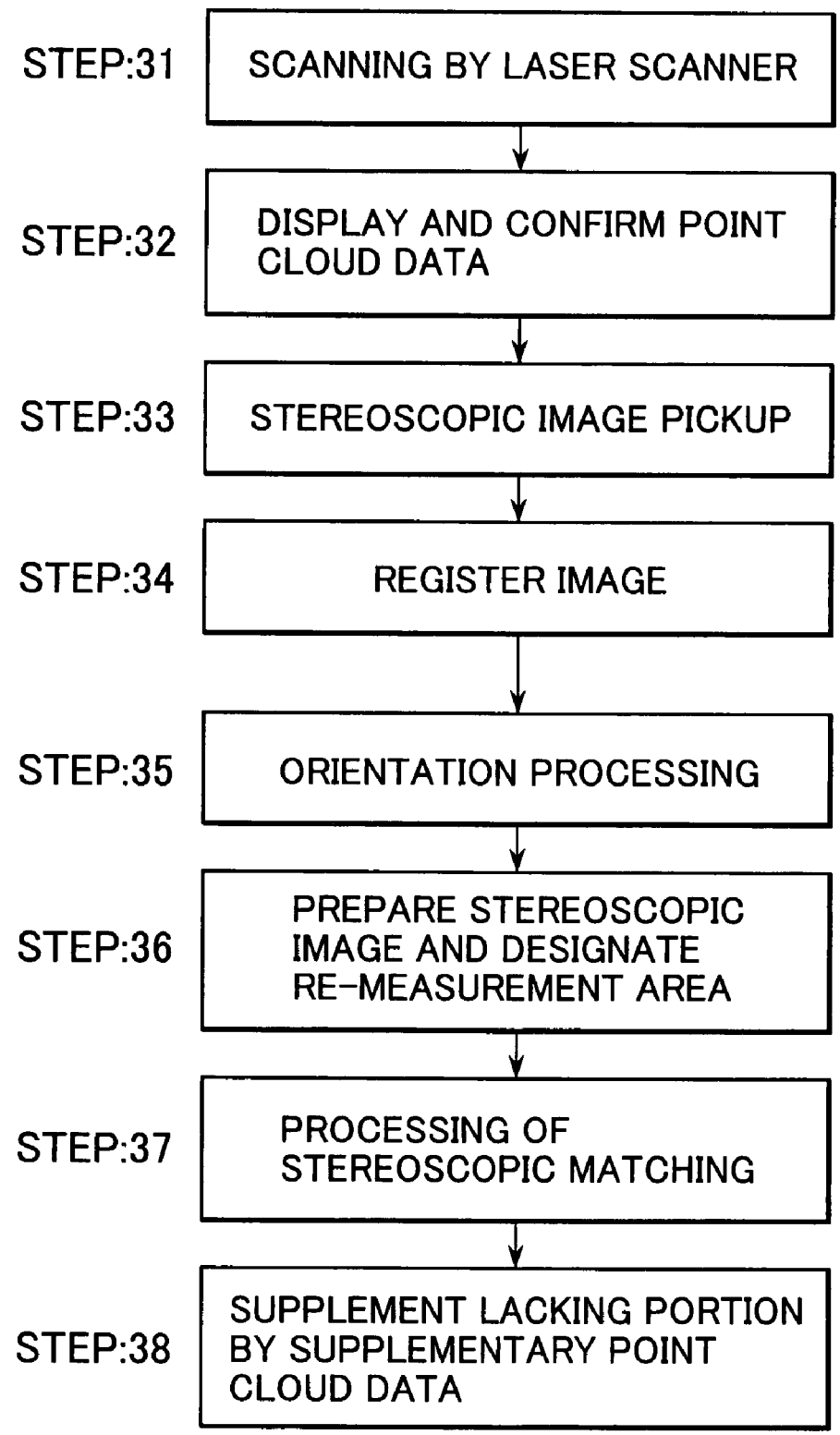
FIG. 19 is a flow chart to show a basic flow of the surveying data processing in an embodiment of the invention.

Referring to FIG. 19, description will be given on a basic flow of surveying data processing in the present invention.

(Step 31) A pulsed laser beam is projected by the laser scanner 1. Then, the measurement area is scanned, and a main point cloud data of the measurement area is acquired. By the image pickup unit 5, a main image data of the measurement area is acquired. The main point cloud data is turned to TIN, and texture mapping of the main image data is performed on the main point cloud data.

The main point cloud data, the main image data and the data acquired by texture mapping of the main image on the main point cloud data by texture mapping are stored via the external storage unit 59 in a recording medium, such as a memory card, for instance. The memory card is taken from the external storage unit 59 and is loaded into the auxiliary storage unit 96. The data such as the main point cloud data, etc. are read from the memory card and is stored in the main storage unit 93.

Figure 20:
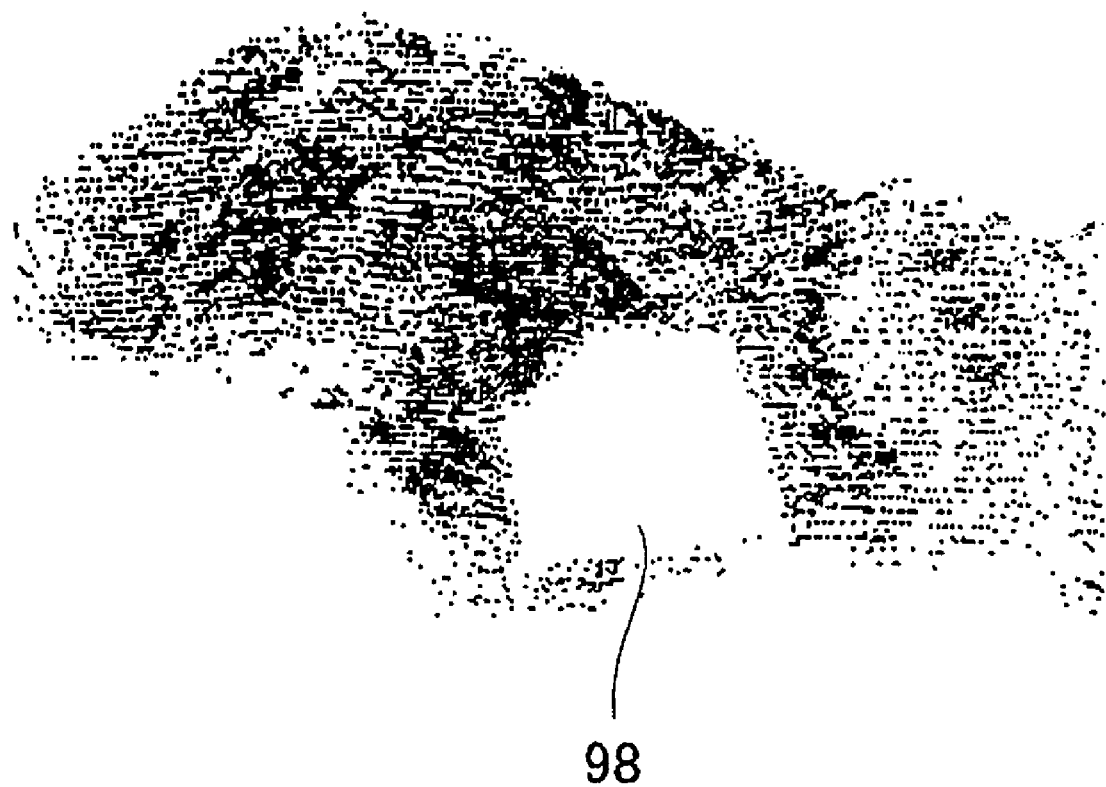
FIG. 20 is a drawing to show a data-lacking portion in the acquisition of the main point cloud data by the laser scanner in the embodiment of the present invention.

(Step 32) The main point cloud data is displayed on the display unit 95, and a range with no data acquired of the main point cloud data is confirmed. For instance, the range with no data acquired is a data-lacking portion 98 (see FIG. 20), which is behind obstacle(s) such as a vehicle, a tree, etc. By displaying the main point cloud data, the data-lacking portion can be readily discerned by visual inspection. The main point cloud data may be displayed together with the main image data.

Among the point data of the main point cloud data, a boundary point data where adjacent data are lacking is detected. By connecting the boundary point data and by executing data processing to prepare a polyline, the range with no data acquired can be automatically identified. Description will be given below on a case where the range with no data acquired is the lacking portion 98.

(Step 33) By the image pickup device 81, an image of the range with no data acquired is taken by stereoscopic image pickup. In the stereoscopic image pickup, images of the lacking portion 98 are taken from at least two directions (left and right; up and bottom), and the images are acquired. When the images are taken by changing the directions, portions of the images are overlapped on each other. As the image pickup device 81, it is preferable to use a digital camera or the like to record the images as electronic data. The image data thus acquired is stored as a supplementary image data in a recording medium such as a memory card.

In case the lacking portion 98 is large and extensive, a multiple of supplementary image data are acquired so that the whole portion can be covered.

(Step 34) The memory card is loaded into the auxiliary storage unit 96, and the supplementary image data is stored in the main storage unit 93. For instance, the supplementary image data are stored in the order of the left image and the right image, and these are registered as a stereoscopic pair. Together with the registration of the supplementary image data, image pickup conditions (calibration data) such as the image pickup direction, the image pickup position, tilting with respect to the image pickup light optical axis, etc. are registered.

(Step 35) The supplementary image data in form of a stereoscopic pair are selected, and orientation processing to prepare a stereoscopic image is conducted. The orientation of the supplementary image data of the stereoscopic pair is performed according to the points selected from the main point cloud data. Therefore, the setting of the reference point and the measurement for the orientation in the acquired image are not performed. The orientation processing will be discussed in detail later.

(Step 36) Based on the result of the orientation in Step 35, a stereoscopic image (a deviation-corrected image) is prepared from the image arbitrarily taken.

The stereoscopic image is an image without longitudinal parallax with the relative tiling of the left and right images corrected and the stereoscopic image can be taken in stereoscopic vision. The main point cloud data is displayed on the stereoscopic image, and it is confirmed whether the stereoscopic image completely covers the lacking portion 98 or not. At the same time, conformity (whether there is abnormality in the measurement data or not) or the like is checked in the scanning data.

If there are defects in the supplementary image data or if abnormality is found in the conformance of the point cloud data, the portion in question is measured again. In case there are lost portions in the supplementary image data, an image is taken on the lost portion, and a stereoscopic image is prepared. For the case where there is abnormality in the conformance of the point cloud data, a range of re-measurement is manually specified by using a mouse, etc. on the image. Or, a polyline is automatically prepared as described above, and a re-measurement rang is set. Then, measurement is performed again by the laser scanner 1, and a re-measured point cloud data is acquired. Then, the re-measured point cloud data is combined on the main point cloud data.

(Step 37) Based on the stereoscopic image prepared in Step 36, supplementary point cloud data of a range of the acquired supplementary image is automatically determined by data processing.

A point-to-point interval is set up so that the point-to-point interval in the supplementary point cloud data will be identical with the point-to-point interval in the main point cloud data as measured by the laser scanner 1. The supplementary point cloud data obtained by automatic measurement is stored in the main storage unit 93.

(Step 38) A predetermined number of reference points are selected from the main point cloud data. From the supplementary point cloud data, corresponding points to correspond to the reference points are selected. Based on the reference points and the corresponding points, matching is performed on the main point cloud data and the supplementary point cloud data.

The supplementary point cloud data acquired in Step 37 is combined on the main point cloud data. Orientation of the stereoscopic image is performed by using the main point cloud data, and the supplementary point cloud data measured on the stereoscopic image is calculated in the same coordinate system as that of the main point cloud data. Therefore, the supplement (replenishment) of the lacking portion 98 of the main point cloud data by the supplementary point cloud data can be conducted immediately without complicated processing.

Next, description will be given individually on main data processing among the basic flows of the surveying data processing.

Figure 21:
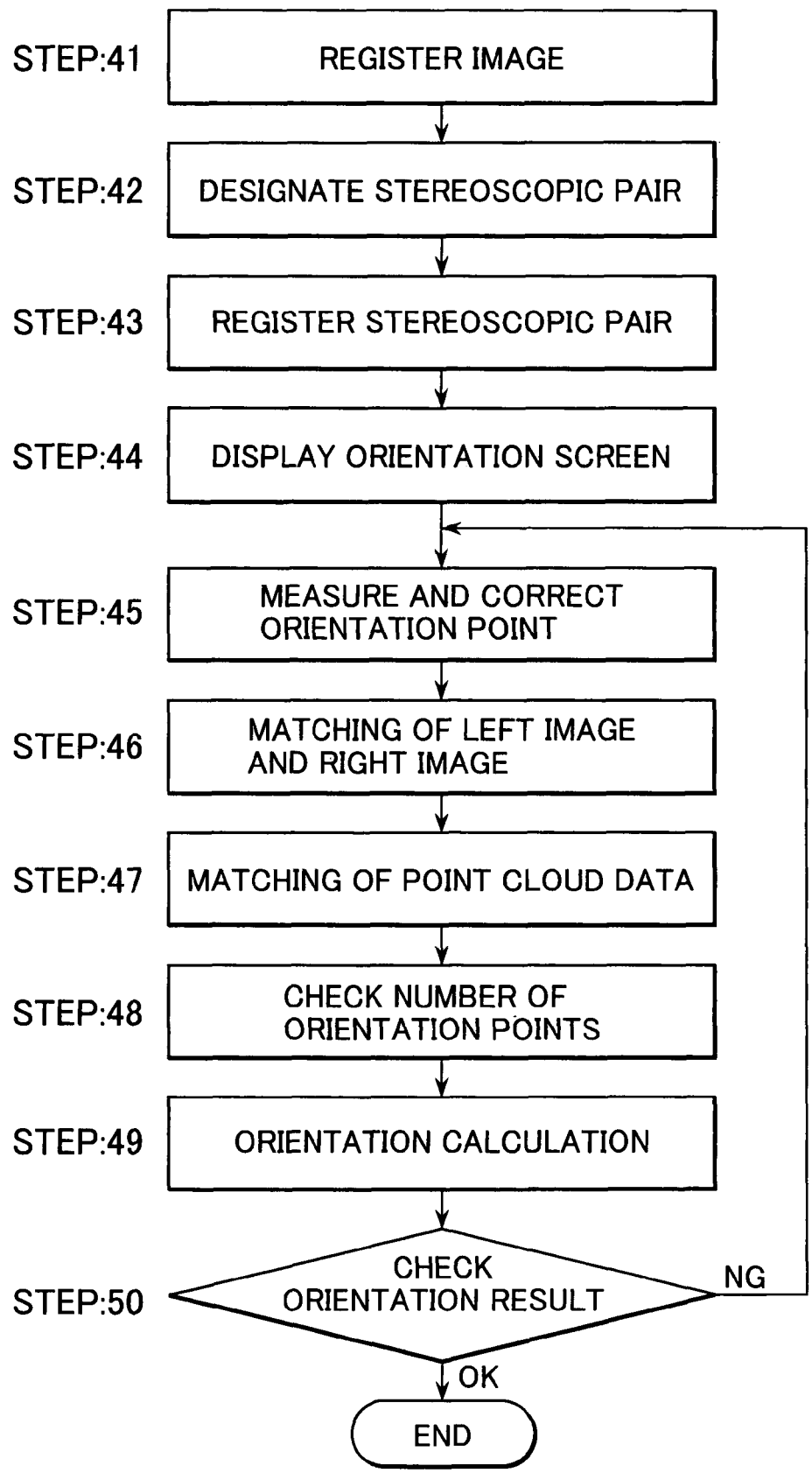
FIG. 21 is a flow chart to show a flow in the orientation of stereoscopic images in the embodiment of the invention.

First, referring to FIG. 21, description will be given on the orientation of the stereoscopic image.

(Step 41) The lacking portion 98 of the main point cloud data acquired by the laser scanner 1 is identified or detected. An image of the lacking portion 98 is taken by the digital camera, and supplementary image data of the lacking portion 98 is acquired. The supplementary image data is stored in the main storage unit 93, and based on the supplementary image data, an image of the lacking portion 98 is displayed.

(Step 42) Among the images registered, the images to become a stereoscopic pair are designated in a predetermined order (e.g. right image and left image). The stereoscopic pair may be designated by using a mouse or the like on the image. Or, the lacking portion 98 may be detected according to a program, and the supplementary image data corresponding to the lacking portion 98 may be searched.

(Step 43) In the case there are two or more lacking portions, or in the case the lacking portion is extensive, the images of the stereoscopic pair corresponding to the lacking portions or the images of a plurality of stereoscopic pairs corresponding to the lacking portions are registered for orientation processing.

(Step 44) The supplementary image and the main point cloud data registered in Step 43 are displayed on the display unit 95. The main point cloud data may be displayed through texture mapping of the image on the main point group.

(Step 45) The main point cloud data and the supplementary image thus displayed are compared with each other. If the supplement by the supplementary image is incomplete, the image of the insufficient portion is further taken by the image pickup device 81, and the image data is added. In the case the supplementary image is extensive enough to completely cover the lacking portion 98, an orientation point is selected, and coordinates are measured.

In the case of a stereoscopic image, the orientation point is the coordinates (x, y) on the image of the corresponding points (the same point) on the left and the right images, and the orientation point is also called a "pass point".

In relative orientation, it is necessary to perform measurement on six or more pass points. Among these pass points, if ground coordinates (X, Y, Z) of three points or more are given as reference points, absolute orientation of the stereoscopic image can be performed.

(Step 46) On the left image or on the right image, a portion, for which it is wanted to measure the orientation points, is designated by using a mouse, and matching of the left and the right images is performed. For the processing of matching, correlation processing, SSDA (differential), least squares matching (correlation) (LSM), etc. are used.

When there is a part on where the matching cannot be performed normally (, e.g. because there is no texture), the corresponding points of the left and the right images are accurately determined by manual operation.

For instance, in the case the matching is performed from the left image to the right image, a square template called "window" is set up on the designated left image with the center at the approximate position designated on the left image. A window with the same size as the template is moved on the right image. A position is searched, where density values of the images of the left image and the right image are most similar to each other, and the corresponding point is determined. Here, degree of similarity is 1 at maximum in case of the normalized correlation processing. In case of SSDA (differential), the minimum value (0) is a value for the most similarity.

Here, as an example, it is supposed that the size of the template on the left image is 15×15 pixels (in FIG. 22, reference numeral 101 represents the template of the left image) and that the width of search is two times or more of the size. The size of the window on the right image is set to about 31×31 pixels (in FIG. 22, reference numeral 102 represents the window of the right image). After performing the search from the left image to the right image, back-matching is performed from the right image to the left image by using the result, and reliability may be increased by evaluating the concurrence of the corresponding points thus obtained.

Figure 22:
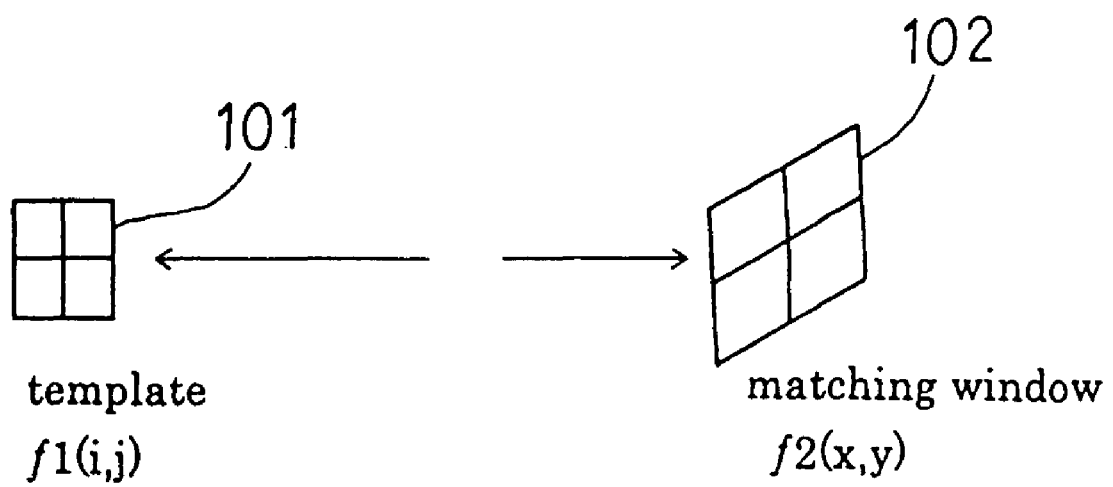
FIG. 22 is a schematical drawing to explain least squares matching.

Further, here, the least squares matching (LSM) which is a matching method effective for surface roughness of the object to be measured and distortion of projection is used, and the matching between the images is performed with high accuracy. As shown in FIG. 22, the least squares matching is a method, according to which matching (pattern comparison) is conducted by changing the shape of the window 102 on the right image by affine transformation and the corresponding points are measured in the unit of sub-pixel.

Here, the template 101 when pattern comparison is made is supposed to be f1 (i, j), and the transformed window 102 is supposed to be f2 (x, y), and transformation of the window 102 is approximated by affine transformation of the following equations:

$x = a_1 i + a_2 j + a_3$ $y = a_4 i + a_5 j + a_6$

The density difference in the each pixels to be compared is given by the following equations:

$$\sum d(i, j)^2 \to \min$$
$$d(i, j) = f1(i, j) - f2(x, y)$$
$$= f1(i, j) - f2(a1i + a2j + a3, a4i + a5j + a6)$$

Next, the values of a1 to a6 are determined, which satisfy the condition of: $\Sigma d (i, j)^2 \to \min$ Here, a1, a2, a4 and a5 represent transformation of the window 102, and a3 and a6 are coordinates of the detection position to be obtained, and this can be determined with accuracy on the level of sub-pixel. In the relative orientation, it is necessary to perform measurement on six or more corresponding points (pass points) of the left and the right.

(Step 47) The interrelation between the left and the right images on the supplementary image data is determined by matching. Then, the positions identical with the positions in the left and the right images are determined in the main point cloud data. Then, matching is performed on the supplementary image data and the main point cloud data.

As one of the methods for the matching between the main point cloud data and the supplementary image data, image matching between the main image data and the supplementary image data is conducted.

Specifically, the main image data prepared by texture mapping on the main point cloud data is displayed on the display unit 95. The supplementary image data (the right image or the left image of the stereoscopic image obtained in Step 46) is displayed to be overlaid each other and cover the lacking portion 98, and the matching is performed on the supplementary image data and the main image data. The matching of the main point group and the supplementary image data is performed through the matching of the supplementary image data and the main image data.

In the case the matching of the main point cloud data and the supplementary image data cannot be performed, the corresponding points are determined by manual operation.

When the interrelating between the positions in the left and the right images (supplementary image data) and the same position in the main point cloud data is determined, coordinates (X, Y, Z) at this position are obtained from the main point cloud data. The point where the coordinates are acquired is set up as a measuring point. For instance, the measuring point is set up as 01, and the measurement is completed. For the interrelating (correspondence) between the supplementary image data and the main point cloud data, there is no need to perform the interrelating for all pass points. The coordinates (X, Y, Z) of three points or more as reference points would be sufficient for the absolute orientation.

(Step 48) The orientation points are checked. Checking is performed on six or more orientation points, and on three or more reference points selected from the point cloud data. If the result is satisfactory, advance to Step 49. If not, go back to Step 45.

(Step 49) The calculation is performed on relative orientation to determine the relative position and the tilting between the left and right images when images are taken by the image pickup device 81, and the calculation is performed on absolute orientation to determine the positions and the tilting of the stereoscopic image with respect to the reference points is performed.

The results of calculations are checked by standard deviation of longitudinal parallax in the model coordinates of the left and the right images in case of relative orientation. In case of absolute orientation, the results are checked by standard deviation and the like of the residual between the coordinates of the reference point (X, Y, Z) and the coordinates (X', Y', Z') obtained from the calculation. If the reference values are satisfied in both cases, the orientation is completed. If the reference values are not satisfied, go back to Step 45 and correction (re-measurement), addition, etc. of the orientation points should be performed.

Figure 23:
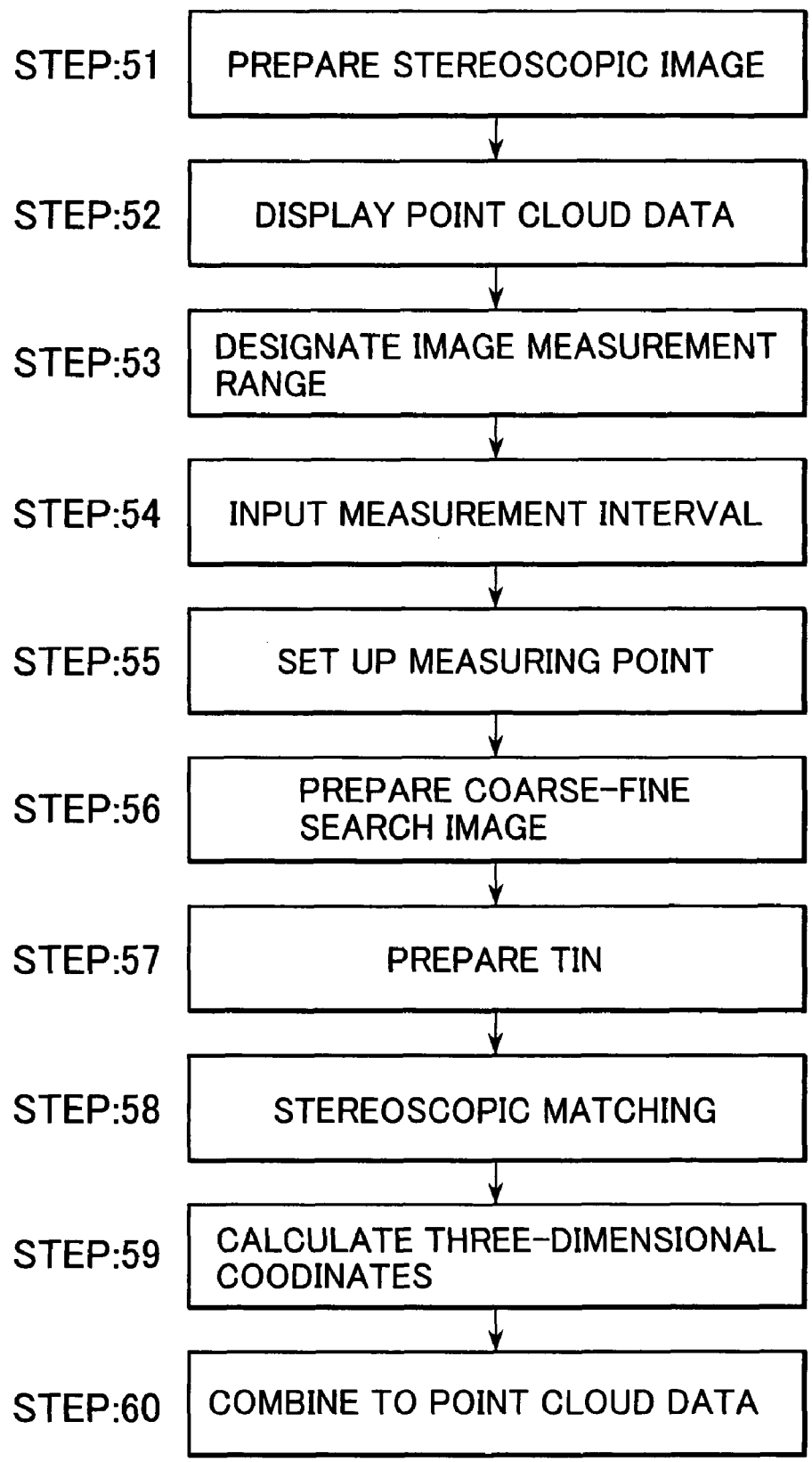
FIG. 23 is a flow chart to show a flow of stereoscopic matching by using point cloud data in the embodiment of the invention.

Next, referring to FIG. 23, description will be given on stereoscopic matching using the point cloud data.

(Step 51) Based on the results of orientation obtained in the processings in Step 35 and Steps 41 to 50, correction is made on the relative tilting of the left and the right images of the supplementary image data. Based on the supplementary image data, a stereoscopic image (deviation-corrected image) is prepared. The deviation-corrected image is the image by correcting longitudinal parallax of the left and the right images. The same point of the left and the right images perfectly concur with each other in a longitudinal direction (Y-coordinate). This makes it possible to perform subsequent procedure for uni-dimensional search in stereoscopic matching of the left and the right images.

(Step 52) The main point cloud data are displayed on the stereoscopic image.

When the measurement area is scanned by laser scanning by projecting a pulsed laser beam by the laser scanner 1, if a vehicle is stopped in the measurement area, a lacking portion 98 (see FIG. 20) occurs in the main point cloud data in the shadow of the vehicle.

(Step 53) The lacking portion 98 of the main point cloud data is checked, and the supplementary measurement range is set up in the stereoscopic image. The supplementary measurement range is designated by a polygon (continuously connected line).

The supplementary measurement range is set manually by using a mouse or the like. Or, a holed portion is automatically recognized, the point cloud data at the circumference of the hole are automatically connected, and the supplementary measurement range is designated.

(Step 54) The measurement interval when supplementary point cloud data is measured from the stereoscopic image is inputted. In the case the measurement interval is not specifically designated, the average measurement interval of the main point cloud data obtained by laser scanning is displayed. In the case the supplementary point cloud data is acquired by image measurement with the same density as the main point cloud data, the measurement is performed at the same measurement interval.

(Step 55) In the case the supplementary point cloud data is acquired by the image measurement with the same density as the main point cloud data, the measuring point is set on the image of one of the stereoscopic image (e.g. left image) at the inputted measurement interval in the designated range.

(Step 56) Before the matching of the measuring point as set up in Step 55 is performed, pyramid images are prepared by gradually reducing the image size by ½ each time. The pyramid images are prepared until the size of the smallest image is about 256×256 in size, and the levels of the pyramid images depend on the size of the first image to be processed.

Figure 24:
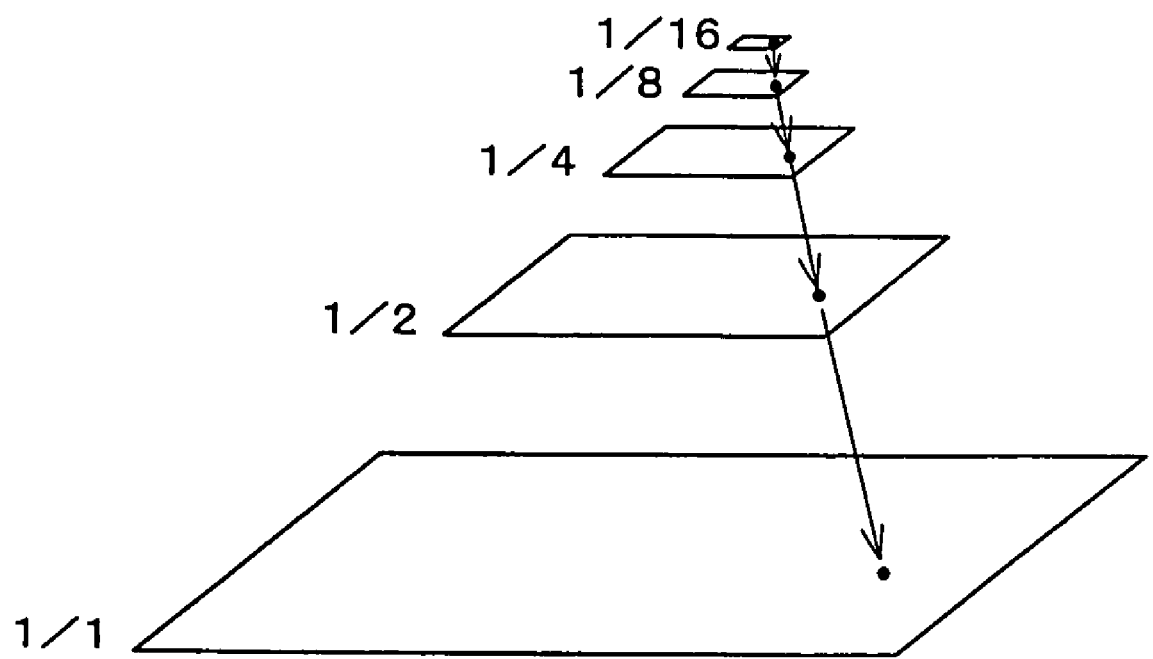
FIG. 24 is a schematical drawing to show a coarse-fine searching method in the embodiment of the invention.

FIG. 24 shows an example, in which the image is sequentially reduced in size to ¹⁄₁₆.

To perform the matching, a coarse-fine searching method is used. Starting from the coarsest stage, i.e. ¹⁄₁₆, it is converged to ⅛, ¼, ½, and to the image with equal size. The coarse-fine searching method reduces the influence from repeating pattern or distortion of projection or the like and improves the reliability of the matching, and this contributes to the implementation of high-speed processing.

(Step 57) In the inner space of the polyline which sets up the measurement range in the stereoscopic images in Step 53, the point cloud data included in the inner space are connected with each other by lines, and TIN is prepared. The vertexes of the polygon have three-dimensional data. By preparing TIN, initial values and parallax in the matching of the first stage can be interpolated via the triangle of the TIN. By giving the initial value of the parallax, the reliability of the matching can be improved.

(Step 58) The interrelating of the left and the right images is performed by the least squares matching.

From TIN prepared in Step 57, the measuring point is interpolated and this is used as the initial value (coarse image) of the matching. In this case also, matching is performed by the coarse-fine searching method.

(Step 59) According to the corresponding points of the left and the right images obtained by stereoscopic matching, three-dimensional coordinates are calculated for all of the measuring points in the supplementary measurement range designated in Step 53 are calculated.

(Step 60) The supplementary point cloud data calculated in three-dimensional coordinates are automatically combined to the original main point cloud data acquired by the laser scanner 1.

When orientation of the stereoscopic image is made by the main point cloud data of the laser scanner in advance, the stereoscopic image is transformed in the same coordinate system as the supplementary point cloud data obtained in the image measurement, and there is no need to perform position alignment. Further, measurement can be made with the same interval as the point cloud data by the laser scanner.

What is claimed is:

1. A surveying method, comprising a step of acquiring a main point cloud data on a predetermined measurement range by a laser scanner, a step of detecting a range with no data acquired, a step of acquiring a supplementary image data of the range with no data acquired by an auxiliary image pickup device, a step of preparing a stereoscopic image based on the supplementary image data obtained by said auxiliary image pickup device, a step of acquiring supplementary point cloud data from the stereoscopic image, and a step of supplementing the range with no data acquired of said main point cloud data by matching of the main point cloud data and the supplementary point cloud data.

2. A surveying method according to claim 1, wherein said laser scanner acquires the point cloud data and a main image data associated with the point cloud data.

3. A surveying method according to claim 2, wherein the matching of said main point cloud data and said supplementary point cloud data is performed by image matching of said main image data and said supplementary image data.

4. A surveying method according to claim 1, wherein the matching of said main point cloud data and said supplementary point cloud data is performed by association of reference points adequately selected from said main point cloud data and points in said supplementary point cloud data corresponding to said reference points.

5. A surveying method according to claim 1, wherein the range with no data acquired is a range adjacent to the measurement range.

6. A surveying method according to claim 1, wherein the range with no data acquired is a data-lacking portion, for which point data could not be obtained by the laser scanner.

7. A surveying method according to claim 1, wherein the range with no data acquired is identified by displaying the main point cloud data in a display unit.

8. A surveying method according to claim 1, wherein the range with no data acquired is identified by detecting a boundary where adjacent point data on the inner side is lacking in the main point cloud data.

9. A surveying system, comprising a laser scanner for scanning a predetermined measurement area by projecting a pulsed laser beam, for receiving a reflected light of the pulsed laser beam, for measuring three-dimensional position data of a projecting point of the pulsed laser beam for each pulse, and for acquiring a main point cloud data of the measurement area, an auxiliary image pickup device being separated from said laser scanner and being able to acquire a supplementary image data from an arbitrary direction, and a surveying data processing device including a storage unit, an arithmetic control unit and a display unit, wherein a main point cloud data acquired by said laser scanner and a supplementary image data acquired by taking images of the range with no data acquired of the laser scanner from at least two directions by said auxiliary image pickup device are registered in said storage unit, and wherein said arithmetic control unit prepares a stereoscopic image based on said supplementary image data, acquires supplementary point cloud data on said range with no data acquired, associates the supplementary point cloud data with said main point cloud data, and supplements the range with no data acquired of the main point cloud data by the supplementary point cloud data.

10. A surveying system according to claim 9, wherein said laser scanner comprises a main image pickup device for acquiring a main image data by taking an image of the measurement area on an image pickup light optical axis coaxial with a projection light optical axis of the pulsed laser beam.

11. A surveying system according to claim 10, wherein the main image data taken by said main image pickup device is associated with said main point cloud data and is registered in said surveying data processing device together with said main point cloud data, wherein said surveying data processing device associates said main point cloud data with said supplementary point cloud data through image matching of the main image data and the supplementary image data.

12. A surveying system according to claim 9, wherein the association of said supplementary point cloud data with said main point cloud data is performed by association of reference points selected from said main point cloud data and points in said supplementary point cloud data corresponding to the reference points.

13. A surveying system according to claim 9, wherein said arithmetic control unit displays individually on said display unit at least said main point cloud data among said main image data, said main point cloud data, said supplementary image data and said supplementary point cloud data.

14. A Surveying data processing program stored on a computer-readable medium for executing a step to detect a range with no data acquired in main point cloud data on a predetermined measurement area obtained by a laser scanner, a step to calculate supplementary point cloud data of the range with no data acquired based on supplementary image data of the range with no data acquired from at least two directions taken by an auxiliary image pickup device, a step to perform matching of said main point cloud data and said supplementary point cloud data, and a step to supplement the range with no data acquired of said main point cloud data by said supplementary point cloud data.

15. A surveying data processing program according to claim 14, wherein the step to perform matching of said main point cloud data with said supplementary point cloud data is executed by a step to select adequate reference points from said main point cloud data, a step to select points in said supplementary point cloud data corresponding to the reference points, and a step to perform association of the selected reference points and said corresponding points.

16. A surveying data processing program according to claim 14, wherein said range with no data acquired is identified by detection of a boundary where adjacent point data on the inner side is lacking in said main point cloud data.

17. A surveying data processing program according to claim 14, wherein the step to perform matching of said main point cloud data with said supplementary point cloud data is executed by a step to perform image matching of an image data of the measurement area associated with said main point cloud data and the supplementary image data of said range with no data acquired.

18. A surveying data processing program according to claim 14, wherein, among main image data acquiring the measurement area coaxial with a measuring light optical axis by a main image pickup device disposed on said laser scanner, said main point cloud data, said supplementary image data and said supplementary point cloud data, at least said main point cloud data is individually displayed.

* * * * *